United States Patent
Ramagiri et al.

(10) Patent No.: US 10,942,865 B2
(45) Date of Patent: Mar. 9, 2021

(54) SNOOPING WITH ACCESS PERMISSIONS

(71) Applicant: Arm Limited, Cambridge (GB)

(72) Inventors: Gurunath Ramagiri, Austin, TX (US); Tushar P. Ringe, Austin, TX (US); Mukesh Patel, Round Rock, TX (US); Jamshed Jalal, Austin, TX (US); Iat Pui Chan, Cedar Park, TX (US); Lakshmi Joga Vishnu Vardhan Badukonda, Bee Cave, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/440,533

(22) Filed: Jun. 13, 2019

(65) Prior Publication Data

US 2020/0394141 A1    Dec. 17, 2020

(51) Int. Cl.
    *G06F 12/1081*      (2016.01)
    *G06F 12/0864*      (2016.01)
    *G06F 12/0877*      (2016.01)

(52) U.S. Cl.
    CPC ...... *G06F 12/1081* (2013.01); *G06F 12/0864* (2013.01); *G06F 12/0877* (2013.01)

(58) Field of Classification Search
    CPC .................................................. G06F 12/0831
    See application file for complete search history.

(56) References Cited

U.S. PATENT DOCUMENTS

| | | | |
|---|---|---|---|
| 2014/0052905 A1* | 2/2014 | Lih | G06F 13/1663 711/105 |
| 2017/0168939 A1* | 6/2017 | Jalal | G06F 12/0833 |
| 2018/0157590 A1 | 6/2018 | Persson et al. | |
| 2018/0227382 A1* | 8/2018 | Mannava | H04L 67/2842 |
| 2019/0073324 A1 | 3/2019 | Ringe et al. | |

* cited by examiner

*Primary Examiner* — Edward J Dudek, Jr.
(74) *Attorney, Agent, or Firm* — Leveque IP Law, P.C.

(57) ABSTRACT

A method and apparatus are provided to enable snoop forwarding to occur together with memory protection. A data processing apparatus in, for instance, the form of a home node forwards a snoop forwarding request on behalf of a requester to a target, the snoop forwarding request being capable of indicating one or more access permissions of the target in relation to the data. A further data processing apparatus in the form of, for instance, a receiver node may receive the snoop forwarding request and based on its own permissions that are provided in the snoop forwarding request, together with the state of the data, either provide a response back to the requester or the home node. In a still further data processing apparatus in the form of, for instance, a Memory Protection Unit (MPU), a regular snoop forwarding request made to a target in relation to data can be forwarded to the target or demoted to a non-forwarding snoop request based on the permissions of the target in relation to the data at the MPU.

21 Claims, 15 Drawing Sheets

SNOOPING WITH ACCESS PERMISSIONS

BACKGROUND

The present disclosure relates to data processing More particularly, it relates to snooping in a coherent system.

Direct Cache Transfer (DCT) is a technique used in, for instance, distributed systems where data held by a cache of one processor can be directly passed to the cache of another processor, without the data being written back to memory or passing through a home node. Such a system improves latency as compared to the situation where the data must be passed back to a home node and then sent from the home node to the requester. However, in some systems, memory protection may be used to control the extent to which different processors/caches can modify data. For instance, some processors/caches may be permitted full access to some regions of memory, while other processors/caches may only be permitted read access to those same regions of memory. Typically, however, such techniques cannot be used in combination without unofficial modifications made to data 'leaking' as a result of DCT.

BRIEF DESCRIPTION OF THE DRAWINGS

The present invention will be described further, by way of example only, with reference to embodiments thereof as illustrated in the accompanying drawings, in which.

DETAILED DESCRIPTION

Figure 1:
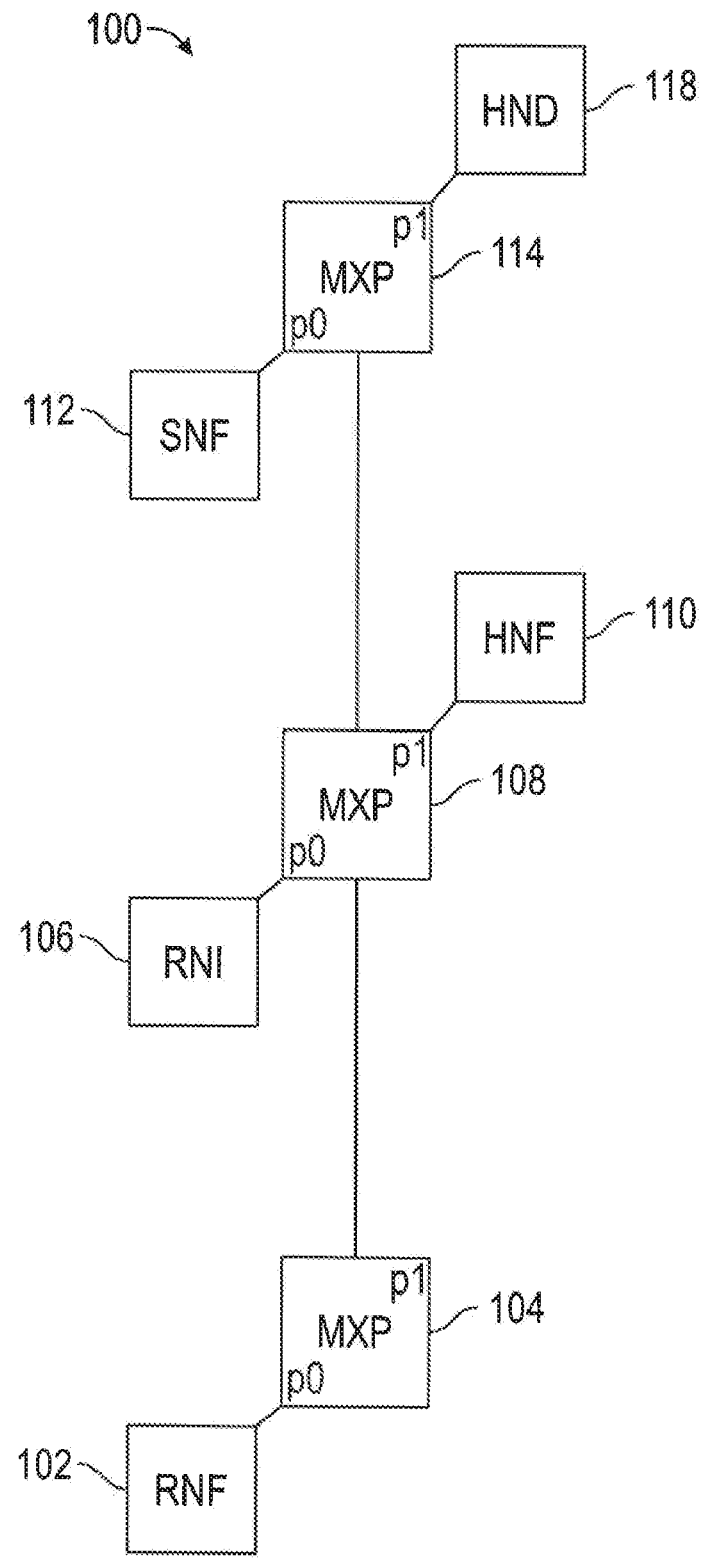
FIG. 1 shows a schematic of a data processing network in accordance with some embodiments.

Viewed from a first example configuration, there is provided a data processing apparatus comprising: receive circuitry to receive a request to access data at an access address from a requester; processing circuitry to generate a forwarding snoop request, wherein the forwarding snoop request causes a target to forward the data to the requester; and transmit circuitry to send the forwarding snoop request to the target, wherein the forwarding snoop request is capable of indicating one or more access permissions of the target in relation to the data.

Viewed from a second example configuration, there is provided a method comprising: receiving a request to access data at an access address from a requester; generating a forwarding snoop request, wherein the forwarding snoop request causes a target to forward the data to the requester; and sending the forwarding snoop request to the target, wherein the forwarding snoop request is capable of indicating one or more access permissions of the target in relation to the data.

Viewed from a third example configuration, there is provided a data processing apparatus comprising: receive circuitry to receive a forwarding snoop request from a home node to provide data at an access address to a requester; permission obtaining circuitry to obtain, for one or more address ranges, an access permission of a target of the forwarding snoop request; and transmit circuitry to transmit an outgoing snoop request to a target of the forwarding snoop request, wherein the permission obtaining circuitry is adapted, in response to receiving the request to access data, to obtain a permission corresponding to one of the one or more address ranges that encompasses the access address range as the one or more access permissions; and a type of the outgoing snoop request is based on the corresponding permission.

Viewed from a fourth example configuration, there is provided a method comprising: receiving a forwarding snoop request from a home node to provide data at an access address to a requester; storing, for one or more address ranges, an access permission of a target of the forwarding snoop request; and transmitting an outgoing snoop request to a target of the forwarding snoop request; and determining, in response to receiving the request to access data, one of the one or more address ranges that encompasses the access address range; acquiring a corresponding permission as the one or more access permissions, wherein a type of the outgoing snoop request is based on the corresponding permission.

Viewed from a fifth example configuration, there is provided a data processing apparatus comprising: receive circuitry to receive a forwarding snoop request from a home node to provide data at an access address to a requester, wherein the forwarding snoop request is capable of indicating one or more access permissions of the data processing apparatus in relation to the data; cache circuitry to store the data together with associated modification indicator; and transmit circuitry to transmit a snoop response based on the one or more access permissions and the modification indicator.

Viewed from a sixth example configuration, there is provided a method comprising: receiving a forwarding snoop request from a home node to provide data at an access address to a requester, wherein the forwarding snoop request is capable of indicating one or more access permissions of the data processing apparatus in relation to the data; storing the data together with associated modification indicator; and transmitting a snoop response based on the one or more access permissions and the modification indicator.

Before discussing the embodiments with reference to the accompanying figures, the following description of embodiments is provided.

In accordance with some examples, there is provided a data processing apparatus comprising: receive circuitry to receive a request to access data at an access address from a requester; processing circuitry to generate a forwarding snoop request, wherein the forwarding snoop request causes a target to forward the data to the requester; and transmit circuitry to send the forwarding snoop request to the target, wherein the forwarding snoop request is capable of indicating one or more access permissions of the target in relation to the data.

This data processing apparatus could, for instance, take the form of a home node as used within an interconnect. The receive circuitry receives a request for data from a requester node. A forwarding snoop request is then generated to determine whether other nodes on the interconnect have the requested data. A forwarding snoop request (as opposed to a non-forwarding snoop request) is one that causes a target of the forwarding snoop request to send the requested data (if it is present) to the requester node rather than to the home node. This allows the data to be obtained more quickly than if it must be sent to the home node and then from the home node to the requester. In these examples, the forwarding snoop request is able to indicate access permissions of the target in relation to the data. In this way, a target that is otherwise unaware of its permissions becomes aware of its permissions and can determine an appropriate course of action based on those permissions. In these examples, there is no need for the permissions to actually be provided in the forwarding snoop request. Instead, the forwarding snoop request is capable of providing this information, which is provided on route as the request is sent towards the target.

In some examples, the data processing apparatus comprises snoop filter circuitry to determine, using the access address, the target as a device having current ownership of the data. Snoop filter circuitry can be used to determine nodes that have or are likely to have ownership of particular data that has been retrieved from memory. This can be achieved by watching (snooping) messages exchanged via the interconnect to watch for nodes requesting data from the main memory. In this way, it may be possible to determine or guess which node has ownership of particular data and to request that data directly from the node.

In some examples, the transmit circuitry is adapted to send the forwarding snoop request to the target via a Memory Protection Unit. A Memory Protection Unit (MPU) can be used to define particular ranges of memory together with access permissions for a particular node in respect of each of those ranges. In this way, it is possible to control the extent to which different nodes can access different address ranges in a system.

In some examples, the receive circuitry is adapted to receive a snoop response from the target; and the processing circuitry is adapted: if the snoop response contains the data, to cause the transmit circuitry to forward the data to the requester, otherwise, to cause the transmit circuitry to transmit a request for the data from a main memory and in response to receiving the data from the main memory, to forward the data to the requester. As a consequence of a target of the snoop request receiving the snoop request, a snoop response is issued by the target. Typically, if the target has the requested data that was referred to in the snoop response then the snoop response will contain the data, otherwise it will not. If the snoop response is sent to the home node (e.g. if the snoop request was a non-forwarding snoop request, or if the target of the snoop request was otherwise unable to directly communicate with the requester) then the snoop response is sent to the home node. If the snoop response contains the data then this data will be forwarded on to the requester. Otherwise, the home node may send a request to main memory for the data. When the data is retrieved from main memory, it is forwarded to the requester.

In some examples, the forwarding snoop request comprises a field to indicate the one or more access permissions. The field can be used to indicate the one or more access permissions, which can either by populated by the home node or can be populated as the snoop request is forwarded from the home node to the target. In other embodiments, the permissions can be stored in unused bits of the snoop request message.

In some examples, the data processing apparatus comprises: permission obtaining circuitry to obtain, for one or more address ranges, an access permission of the target, wherein the permission obtaining circuitry is adapted, in response to receiving the request to access data, to obtain a permission corresponding to one of the one or more address ranges that encompasses the access address range as the one or more access permissions; and the processing circuitry is adapted to generate the forwarding snoop request comprising the one or more access permissions. In some embodiments, the permission obtaining circuitry (which could take the form of an MPU or a component designed to query an MPU) obtain the permissions of the forwarding snoop request target in respect of the data and insert the permissions into the forwarding snoop request. In other embodiments, the forwarding snoop request is forwarded to the target and on route, the permissions are inserted into the forwarding snoop request—either by an MPU or by a unit that is able to query an MPU for the relevant permissions.

In some examples, the forwarding snoop request is capable of indicating a shared state of the data. In many coherency systems, data may be marked as shared when a number of nodes have read-only access to that data. In such a situation, each of the nodes is able to store its own local copy of the data, which can be accessed without the need to obtain the data from memory whenever it is to be accessed. This is possible because the data is read-only and hence, none of the nodes is permitted to locally modify the data, which would result in a lack of coherency between the nodes. Hence, when a target node has shared access to data, it implies that the target node must have read-only access to the data. If the target node has read-only access to the data, the data should be unmodified as compared to what is stored in the memory. If the target node obeys the coherency control then there should be no risk that the data has been modified and so the data can be provided by the target to the requester directly. For instance, the one or more access permissions could include whether the target holds the data in a shared clean state.

In some examples, the one or more access permissions include whether the target has write access the data. When a node such as the target node has write access to the data, that node is permitted to modify the data. Consequently, there is little danger of the target node leaking a disallowed modification to other nodes.

In some examples, the request comprises an indication of one or more access permissions of the requester in relation to the data; and the processing circuitry is adapted: if the one or more access permissions of the requester indicate that the requester has both read and write access to the data, to cause the transmit circuitry to transmit the forwarding snoop request to the target, otherwise if the one or more access permissions of the requester indicates that the requester has read access and lacks write access, to cause the transmit circuitry to transmit a non-forwarding snoop request to the target, wherein the non-forwarding snoop request causes the target to forward the data to the data processing apparatus. In such examples, when the request is initially made from the requester, the request will contain access permissions of the requester in relation to the data. Such permissions could be provided by the requester or could be inserted as the request passes from the requester to the home node (e.g. via an MPU). If the requester does not have write access, but instead has read access to the data then a non-forwarding snoop request is used. This is because otherwise, modified data could be sent to the requester without being saved back to memory. The modified data could then be lost since the requester, not having write access, would not be permitted to distribute modified data—even though the modification had been made by a node with write access. To help solve this problem, the modified data is instead returned by a non-forwarding snoop request from the target of the snoop request to the home node. The home node can then save the modified data back to memory as well as return the (now clean) data to the requester. If the requester lacks both read and write access to the data, then a dummy response can be sent, since the requester should not access the data at all.

In accordance with some examples, there is provided a data processing apparatus comprising receive circuitry to receive a forwarding snoop request from a home node to provide data at an access address to a requester; permission obtaining circuitry to obtain, for one or more address ranges, an access permission of a target of the forwarding snoop request; and transmit circuitry to transmit an outgoing snoop request to a target of the forwarding snoop request, wherein the permission obtaining circuitry is adapted, in response to receiving the request to access data, to obtain a permission corresponding to one of the one or more address ranges that encompasses the access address range as the one or more access permissions; and a type of the outgoing snoop request is based on the corresponding permission.

This data processing apparatus could, for instance, take the form of an MPU, or a device incorporating an MPU that is associated with a receiver node. The data processing apparatus decides of whether to allow the forwarding snoop request to pass on to the target (receiver node) or whether forwarding snoop request should be demoted to a non-forwarding snoop request for the same data. The decision is based on the permissions of the target in relation to the data for which the forwarding snoop request is issued. Consequently, the data processing apparatus acts as a filter to the target node. It permits or disallows snoop forwarding by either forwarding the forwarding snoop requests or demoting them, based on the permissions of the target node. The target node need not, therefore, be particularly especially adapted to handling snoop forwarding in systems that utilise memory protection.

In some examples, the type of the outgoing snoop request is any one of: non-forwarding or forwarding. A forwarding snoop request causes a target of the request to send data (if it is held) directly back to the requester that caused the snoop request to be issued if possible. A non-forwarding snoop request instead causes such data to be returned to the home node. From there, the home node will forward the data back to the requester and may take additional actions such as writing the data back to memory.

In some examples, in response to the determination that the one or more access permissions comprise a write permission of the target in relation to the data, the processing circuitry is adapted to select the type of the outgoing snoop request as a forwarding snoop request. If the target of the forwarding snoop request has write permission for the data, then the target is permitted to have modified the data. Consequently, any such modified data is permitted to be distributed to other nodes.

In some examples, in response to the determination that the one or more access permissions lack a write permission of the target in relation to the data, the processing circuitry is adapted to select the type of the outgoing snoop request as a non-forwarding snoop request. If the target of the forwarding snoop request does not have write permission for the data (e.g. if the target has read-only access) then the target is prevented from forwarding any modifications that have been made to other nodes. This is achieved by preventing snoop forwarding from occurring by the data processing apparatus demoting the forwarding snoop request to a non-forwarding snoop request. In this way, if the data has been modified by the target, it cannot be leaked to the requester and is instead returned to the home node where it is dropped.

In some examples, the forwarding snoop request comprises an indication of whether the target has shared access to the data; and in response to the determination that target has shared access to the data, the processing circuitry is adapted to select the type of the outgoing snoop request as a forwarding snoop request. Shared data access permits several nodes to store local copies of data that is otherwise held in memory. However, in order to provide data coherency, the nodes are not permitted to modify the data (they have read-only access). The fact that a node has shared access (e.g. shared clean access) to a node therefore signifies that a node has read-only access to that data, but also that the node is prevented from making a modification to the data in order to provide coherency in the system. In these situations, therefore, the forwarding snoop request need not be demoted and the data can be forwarded directly from the target of the snoop request to the requester.

In some examples, the outgoing snoop request comprises the one or more access permissions. The permissions are included so that, when responding to the snoop request, the target of the snoop request can include the permissions in the response. Consequently, there is no need for the permissions to be re-determined on route. It will be appreciated that if such functionality were to be included by the MXP, for instance, it would be necessary for the MXP to keep track of outgoing snoop requests (since the address of the snooped data may not be included as part of the response). Note that the inclusion of permissions need not necessitate a dedicated field for those permissions. Instead, such permissions could be encoded in unused bits.

In accordance with some examples, there is provided a data processing apparatus comprising: receive circuitry to receive a forwarding snoop request from a home node to provide data at an access address to a requester, wherein the forwarding snoop request is capable of indicating one or more access permissions of the data processing apparatus in relation to the data; cache circuitry to store the data together with associated modification indicator; and transmit circuitry to transmit a snoop response based on the one or more access permissions and the modification indicator.

This data processing apparatus could, for instance, take the form of the target (receiver) node that is the target of the forwarding snoop request. In these examples, the data processing apparatus uses the permissions listed in the request as well as a modification indicator associated with the data to determine whether it is appropriate to respond to the forwarding snoop request by issuing a response to the requester node or the home node. In the latter case, the forwarding snoop request is treated as a regular snoop request. The modification indicator is used to indicate whether the data in question is clean or dirty (i.e. whether the data has been modified as compared to what is stored in the main memory).

In some examples, the transmit circuitry is adapted, in response to the one or more access permissions comprising a write permission of the target in relation to the data, to transmit the snoop response to the requester; and the snoop response comprises the data. When the target is informed that it has write access to the data in the cache circuitry, the target attempts to transmit the snoop response to the requester (e.g. directly) as opposed to going via the home node. The forwarding snoop request is therefore treated as a forwarding snoop request rather than a regular snoop request. This is because, having had permission to modify the data, it is acceptable for any changes to the data made by the target to be distributed.

In some examples, the transmit circuitry is adapted, in response to the one or more access permissions lacking a write permission of the target in relation to the data, and the modification indicator indicating that the data is unmodified, to transmit the snoop response to the requester; and the snoop response comprises the data. In these examples, since the target node does not have write access to the data that is stored, the target attempts to transmit the response containing the data to the requester (e.g. directly) if the data is unmodified. This prevents disallowed modifications to the data from leaking. Hence, in such a situation, the forwarding snoop request is treated as a forwarding snoop request if both the conditions are met.

In some examples, the transmit circuitry is adapted, in response to the one or more access permissions lacking a write permission of the target in relation to the data, and the modification indicator indicating that the data is modified, to transmit the snoop response to the home node and to delete the data from the cache circuitry; and the snoop response indicates that the data processing apparatus lacks the data. In these examples, since the target node does not have write access to the data that is stored and since the data has been modified, the data is dropped/deleted (since modification should not have taken place) and the target node informs the home node that it does not have the data. The home node may then react by querying other nodes or by fetching the data from main memory.

Particular embodiments will now be described with reference to the figures.

FIG. 1 is a schematic of an example data processing network 100. In this example, the network is configured as a 1×3 mesh CMN (coherent mesh network). The cross points (MXP) provide points of intersection in the data processing network and are responsible for routing the protocol packets of a message to the correct node based on the target node identifier. One example of a CMN is the Arm® CoreLink™ CMN-600 Coherent Mesh Network, which is designed for intelligent connected systems across a wide range of applications including networking infrastructure, storage, server, HPC, automotive, and industrial solutions. The highly scalable mesh is optimized for Arm®v8-A processors and can be customized across a wide range of performance points. The data processing network may include a coherent interconnect such as, for example, the ARM® CMN family of products that are based on the ARM® AMBA®5 CHI protocol (ARM® and AMBA® are registered trademarks of Arm Limited). The interconnect specification identifies devices in an interconnect as described below.

The network may include one or more requester nodes that operate as request masters and initiate data transactions. Example requester nodes are:

RNF: Coherent requester node, such as a central processing unit (CPU), coherent graphics processing unit (GPU), or other accelerator that operates as a request master.

RNI: I/O coherent requester node to tunnel input/output (I/O) traffic into a coherent hub interface (CHI) or other network interconnect, for example.

RND: distributed virtual memory (DVM) requester node that supports DVM traffic.

The network may also include one or more home nodes that receive access requests from requester nodes. Each home node serves as a point of coherence, and serialization, for a given set of memory addresses and may include a snoop filter for monitoring data transactions and maintaining a record of which data lines are stored at or owned by one or more nodes. When a memory access is received at a home node, a snoop request may be sent to nodes having copies of the accessed data in their local cache. Example home nodes include coherent home nodes (HNFs) that service normal memory requests and I/O coherent home nodes (HNIs) that are responsible for servicing I/O requests. Such nodes may contain cache memory and a snoop filter for efficient coherency resolution and hence send snoops when required. The cache memory is typically fast random access memory (RAM) that a processor can access more quickly than it can access regular RAM.

In addition the data processing network includes one or more slave nodes that service requests from home nodes if the requests cannot be serviced locally in home nodes. Examples of slave nodes are a memory controller or a requester node. Otherwise, requests are serviced by the home node that receives the request.

As shown in FIG. 1, RNF (coherent requester node) 102 is operatively coupled to MXP (mesh cross-point) 104. MXP 104 is operatively coupled to MXP 108 and MXP 114. MXP 108 is operatively coupled to RNI (I/O coherent requester node) 106 and HNF (coherent home node) 110. MXP 114 is operatively coupled to SNF (coherent slave node) 112 and HND (home node) 118. RNF 102 and RNI 106 access data by sending a request to HNF 110 and HND 118. Slave node 112 may be a dynamic memory controller (DMC), for example.

For read accesses, home node 110 looks up the incoming address in the cache memory and a snoop filter. If the address is available in the cache memory, the request will be serviced by providing the data. If the data is not available in the cache but is available on another node (e.g. at RNF 102) then the home node 110 issues a snoop request to RNF 102 for the data. The snooped RNF 102 can send the data back to home node 110 (so that the home node can service the request) or directly send the data to RNI 106 in a process called DCT (Direct Cache Transfer) depending on the type of snoop request. In the event that the data is not available at any node, then the slave node 112 obtains the requested data from memory.

For write accesses from RNF 102, home node 110 checks if the request is for a partial write or full cache line write. Depending on the size of the request, the home node 110 may merge the request data along with memory data or snooped data. The merged data is either written back to memory (slave node) or may be filled into the cache based on the request attribute and if the cache was present in the home node.

If the request incurred any error in the home node for example, a cache access error or a snoop error, the home node will complete the request by responding with the error status and may optionally raise an interrupt so that the master node knows the access status.

A coherent network protocol, such as the AMBA®5 CHI protocol, may specify various requests:
1. Read requests with data—Responses will include data.
2. Read requests without data—Responses will not include data.
3. Write requests—Writing of clean/modified data from requestors to cache or memory.
4. Cache Maintenance Operations (CMOs)—Flushing of the cache lines to the memory such as DRAM, I/O master or downstream caches and other memory beyond home node.
5. Atomic requests—Performing sub-cache line atomic operations in memory.
6. Stash requests—Operations where the cache line will be stashed inside an RNF cache for future access.

In a coherent network, various actions are performed to ensure that shared data is maintained in a coherent manner. For example, the actions may ensure that a node does not have an out-of-date copy of data. However, Read/Write accesses by unauthorized masters could lead to corrupting memory contents, and simple permission-based filtering does not address coherent systems where the unauthorized master could expose corrupt data in many different ways. Thus, in a protected memory system, some of the desired requests—such as writing modified data back to a shared memory, may be not be permitted by a particular node. This has an impact on coherence maintenance.

The present disclosure is directed towards protecting memory in a coherent data processing network.

Access permissions may be provided by using memory protection units (MPUs) located at cross-points of the data processing network. The MPUs have registers that are configurable to define access permissions for a request coupled to the network at the crosspoint.

Figure 2:
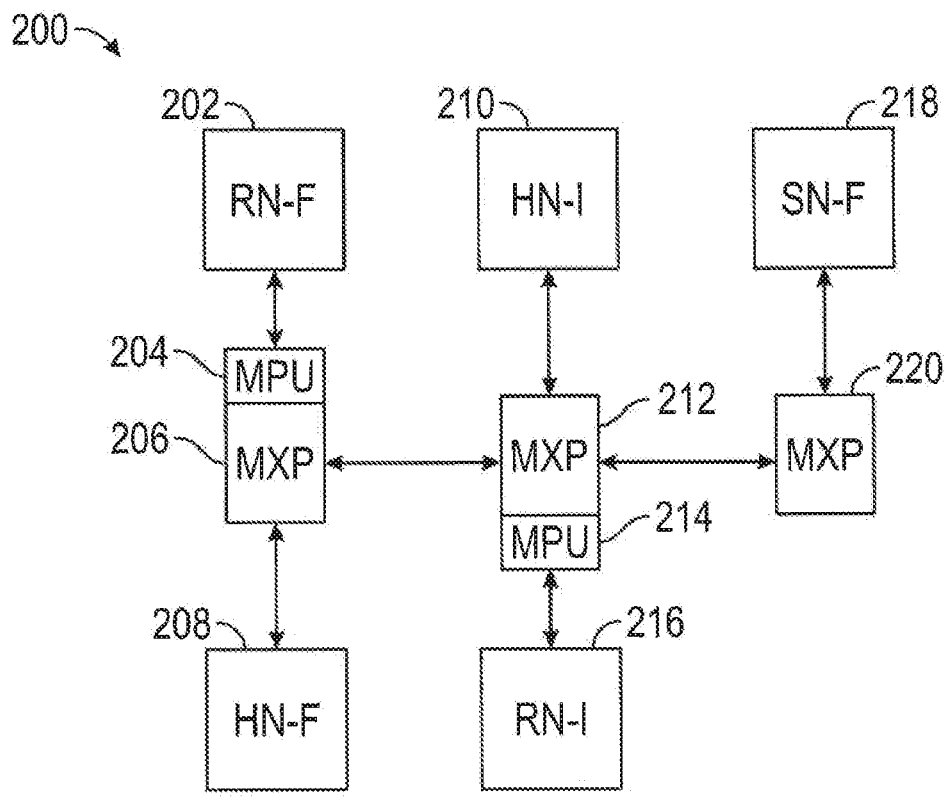
FIG. 2 illustrates system with an example of a data processing network that incorporates memory protection units in accordance with some embodiments.
Figure 3:
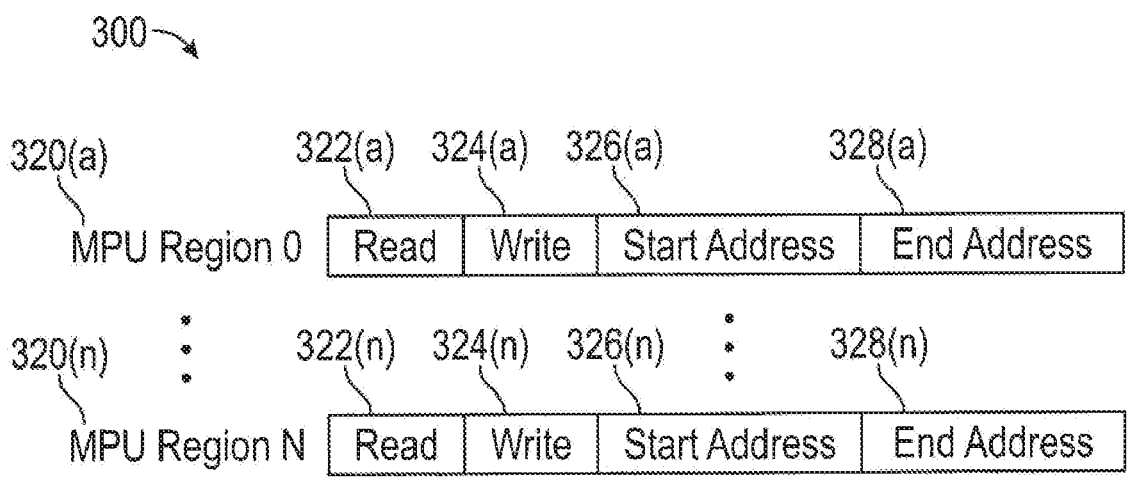
FIG. 3 illustrates an example of memory protection unit (MPU) address regions and permissions in accordance with some embodiments.

FIG. 2 illustrates system 200 with an example of a data processing network that incorporates memory protection units (MPUs). FIG. 2 shows master nodes RN-F 202, RN-I 216, mesh cross-points (MXP) 206, 212, 220, home nodes HN-I 210, HN-F 208, slave node SN-F 218 and MPUs 204, 214. The system 200 of FIG. 2 may be a coherent mesh network, for example. Each of the requester node masters (RN-F 202 and RN-I 216) in system 200 is coupled to the network interconnect via a Memory Protection Unit (MPUs 204 and 214, respectively). The MPUs (204, 214) contain configurable registers which are programmed with address region and the corresponding Read/Write permissions as shown in FIG. 3.

As stated above, the memory protection unit (MPU) 204, 214 may be a computer hardware unit. The MPU may be implemented as part of the central processing unit (CPU), as part of an interconnect fabric, or as a separate hardware module or block. In some embodiments, the MPU is a trimmed-down version of memory management unit (MMU) that provides only memory protection support and may be implemented in low power processors that require only memory protection rather than other memory management features such as virtual memory management.

First requester node 202 is coupled to the home node 208 via a first memory protection unit 204 of the system 200. First memory protection unit 204 receives a request from the first requester node 202, determines the one or more access permissions assigned to the first requester node dependent upon the first memory address, and augments the request with the one or more access permissions for the first requester node before sending it to home node 208.

The access permissions can be stored in bits of the request that are unused in an existing architected interface. In other embodiments, an existing field (such as a transaction identifier field) in the request is extended to store the access permissions. In yet other embodiments, an additional field is added to the request to store the access permissions.

FIG. 3 illustrates an example 300 of memory protection unit (MPU) address regions and permissions. MPU region 0, 320(a), through MPU region N, 320(n) (where 'n' is any suitable number), each have a read indicator 322, write indicator 324, start address 326 and end address 328. The number of MPU regions is a design choice and any suitable number may be used. MPU region 0, 320(a), has associated read indicator 322(a), write indicator 324(a), start address 326(a) and end address 328(a). Similarly, MPU region N 320(n) has associated read indicator 322(n), write indicator 324(n), start address 326(n) and end address 328(n).

When a requester node (e.g. 202 shown in FIG. 2) sends a request to a cross-point (e.g. 204 shown in FIG. 2), the address from the request is looked up in the MPU against regions represented by the start address 326 and end address 328. When a match is found, the corresponding Read and Write indicators 322, 324 for that region 320 are sent along with the request to the home node.

The MPU may also contain default Read/Write permissions if a region match is not found. The HN's then use the R/W permissions to allow access to memory contents.

These permission definitions include:
R: Request has Read Permission
W: Request has Write Permission
~R: Request does not have Read Permission
~W: Request does not have Write Permission A read request from a requester node to a home node is intercepted by the MPU. The memory address to be read is looked-up in a table in the MPU to determine access permissions for the requester node for the memory address. The MPU then augments the read request with the access permissions (APs) and forwards the augmented request to the home node. The flow is thus:

Requester node→RN_Req→MPU Region lookup→RN_Req+APs→Home Node.

For snoop requests that a home node sends to a RNF, the snoop address from the snoop request is looked up in the MPU. The snoop response is augmented with the access permissions and the augmented snoop response is sent back to the home node. The home node can then utilize the access permissions on the snoop response to make a decision. The flow is:

Home Node→HNF_Snp_request→MPU lookup→SnoopResponse+APs→Home Node.

The home node can filter the snoop response based on the R/W access permissions.

A difficulty that arises with the presence of the MPUs is how to handle the access permissions in combination with DCT. Ordinarily, if a node lacks write access to data and if that node modifies the data (against the access permissions) then the 'illegally' modified data can be filtered by the home node. However, with DCT, the snooped data need not pass through the home node and could instead be forwarded directly to the requester node. The inappropriately modified data can therefore be 'leaked'. There are a number of solutions to this problem.

Figure 4:
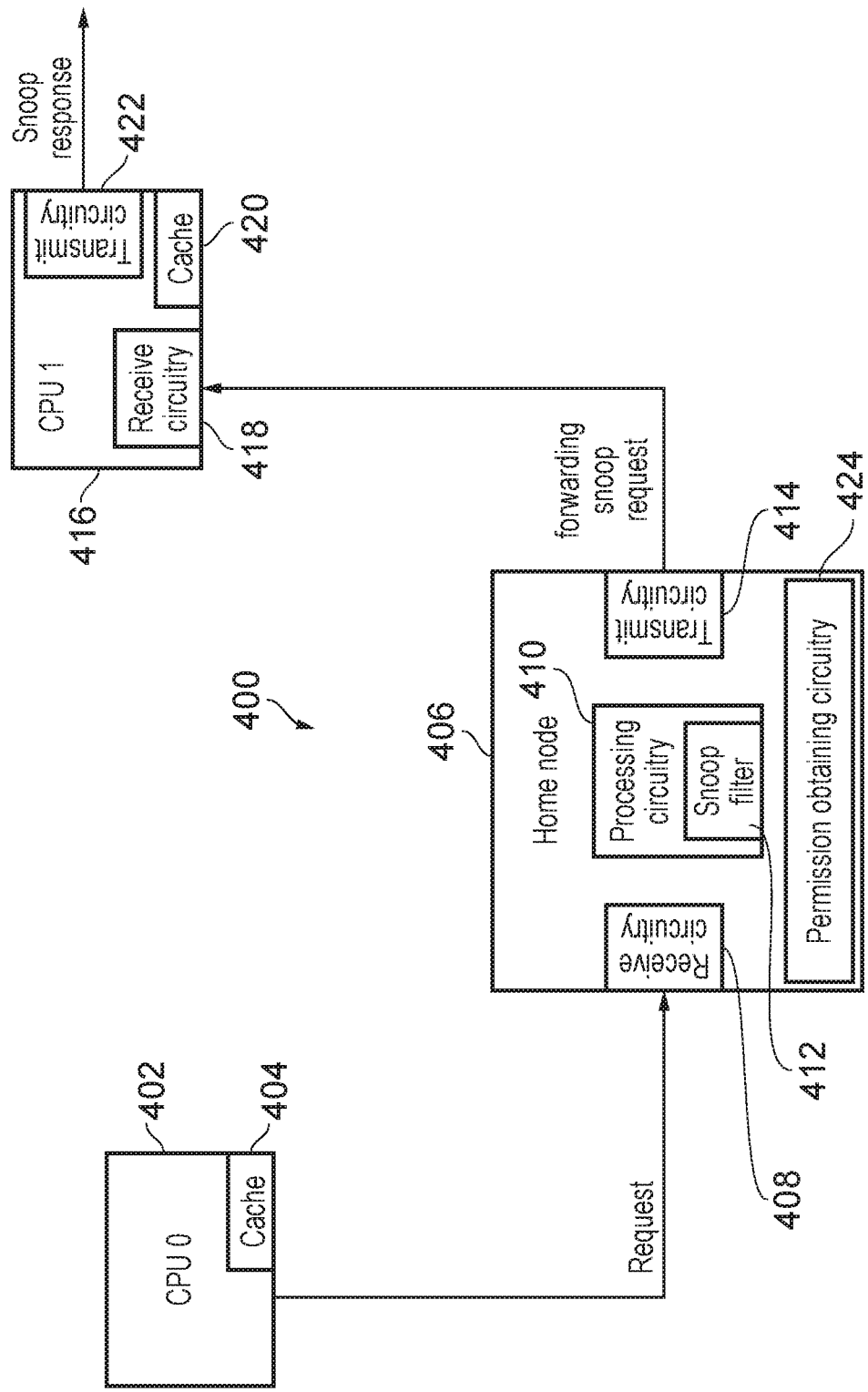
FIG. 4 schematically illustrates a system in accordance with some embodiments.

FIG. 4 schematically illustrates a system 400 in accordance with some embodiments. The system includes a first CPU (CPU0) 402 as a first requester node. In this example, the requester node 402 has cache 404 for storing data. The requester node requests access to data not present in cache 404 by issuing a request to a home node 406. The home node 406 receives the request via receiver circuitry 408. In this embodiment, it is assumed that the home node 406 does not have the requested data, and by the use of a snoop filter 412, the home node 406 determines that the data may be acquired from a cache 420 of a second CPU (CPU1) 416. The second CPU (CPU1) 416 therefore becomes the target of a forwarding snoop request issued by transmit circuitry 414 of the home node 406. The forwarding snoop request is capable of storing permissions of the second CPU (CPU1) in relation to the requested data. These permissions could either be added by permission obtaining circuitry 424 of the home node 406, which could for instance obtain the permissions from a local MPU, or the permissions could be inserted into the snoop request on route, such as via an MPU associated with the second CPU (CPU1) (not shown in FIG. 4).

The forwarding snoop request is received by receive circuitry 418 of the second CPU (CPU1) 416. The second CPU (CPU1) then determines, using the permissions of the second CPU 416 that are in the forwarding snoop request, whether the second CPU 416 has access to the requested data. Depending on the access then the target of the snoop response will be chosen. For example, if the second CPU 416 has write access to the data, then the snoop response containing the data will be sent directly to the requester 402. This is because if the second CPU 416 has write access then there is no illegal modification to 'leak'. Otherwise, the snoop response containing the data is sent to the home node 406. Of course, if the second CPU (CPU1) 416 does not have the data, then an empty snoop response is sent back to the home node 406.

These embodiments therefore utilise a modified snoop request, which encloses permissions of the snoop target node 614 within the snoop request. These permissions can then be considered by the snoop target node 614 and a decision can be taken The following table illustrates the responses taken by the snoop target node 614 when it lacks write access to the requested data:

| Snoop type | Cache hit state | Final cache state | Snoop response |
|---|---|---|---|
| Invalidating type snoop (SnpUnique) | Dirty | Invalid | No data included |
| | Clean | Invalid | Data included |
| Sharing snoop (SnpShared) | Dirty | Invalid | No data included |
| | Clean | Shared | Data included |
| Cleaning snoops | Dirty | Invalid | No data included |

| Snoop type | Cache hit state | Final cache state | Snoop response |
|---|---|---|---|
| (SnpCleanShared) Snoop without changing cache state (SnpOnce) | Clean | Shared or Unique | Data included |
| | Dirty | Invalid | No data included |
| | Clean | Clean | Data included |

In each case, where the data is dirty, the final cache state is 'invalid'—that is to say that the data is dropped because it should not have been modified. If the data is clean, then it is included in the snoop response. For the other cases, a request for unique access to the data (SnpUnique) causes the data to become invalid (i.e. dropped by the snoop target), since it cannot keep the data while another node has unique access to it. In contrast, the response to a SnpShared is to make the data 'shared'. In response to a SnpCleanShared, the data becomes either 'shared' or 'unique' depending on the underlying coherency protocol. For SnpOnce, if the data is clean then it is returned and since the cache state does not change, it remains clean. If the data is dirty, then since the snoop target node 614 lacks write access to the requested data, the data is marked as invalid (despite the fact that the SnpOnce does not generally change the cache state) and the data is not returned.

Figure 5:
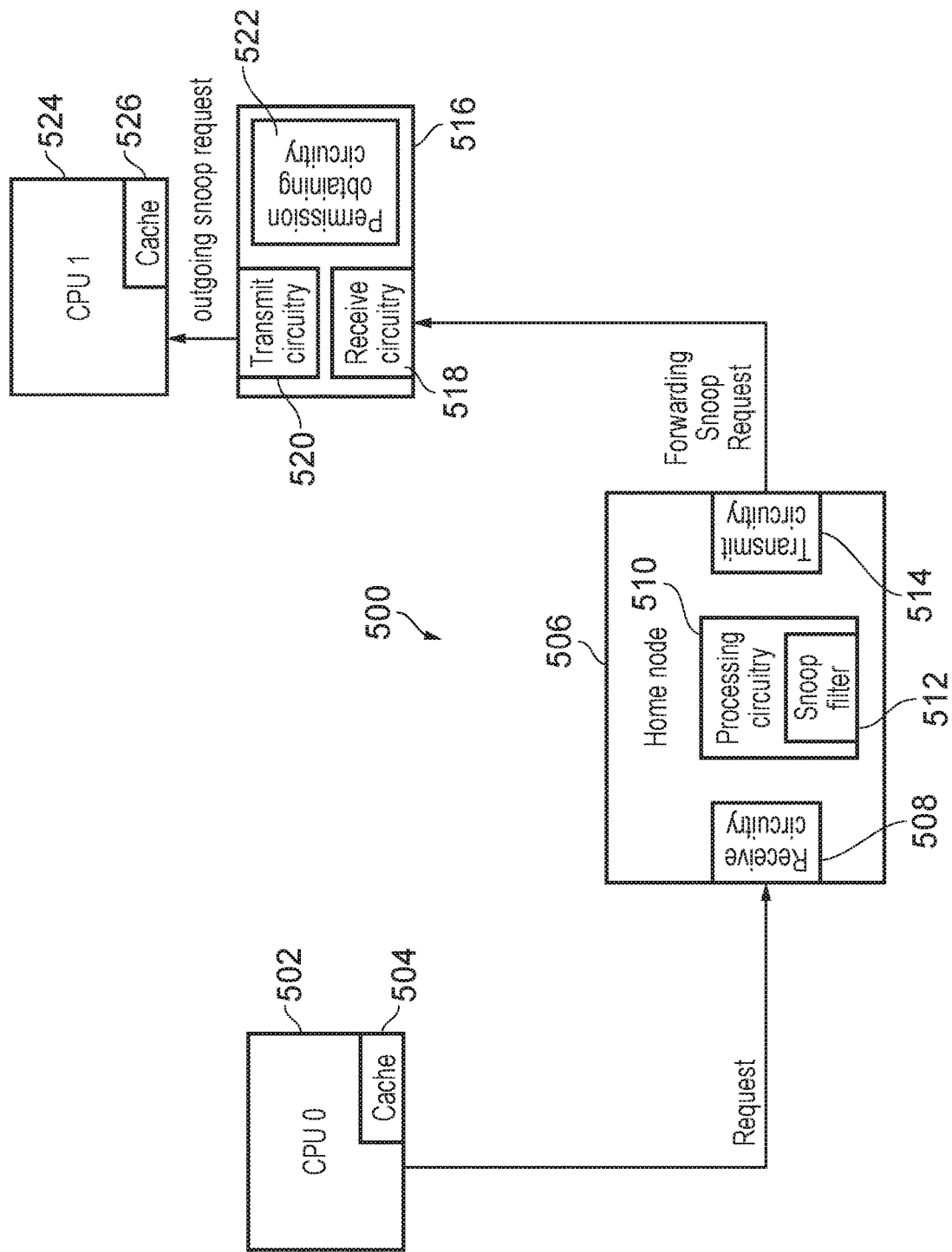
FIG. 5 schematically illustrates an alternative 'architecture agnostic' approach in accordance with some embodiments.

FIG. 5 schematically illustrates an alternative 'architecture agnostic' approach in accordance with some embodiments. In these embodiments, the snoop target need not consider the modified snoop request, and hence the present techniques can be used with 'legacy' nodes. In the system 500 of FIG. 5, the first CPU (CPU0) 502 again requests data that is not in its cache 504. The request is again received by receive circuitry 508 and by the means of processing circuitry 510 using a snoop filter 512, causes transmit circuitry 514 to issue a forwarding snoop request to a second CPU (CPU1) 524 for the data. In these embodiments, the forwarding snoop request is intercepted by a data processing apparatus 516, which could take the form of an MPU. The forwarding snoop request is received by receive circuitry 518 of the data processing apparatus and permission obtaining circuitry 522 determines the permissions of the target of the snoop forwarding request—CPU1 524 in relation to the requested data. The permission obtaining circuitry 522 could obtain the permissions from an MPU, or could itself be an MPU. In any event, if is determined that CPU1 524 has write access to the requested data then the snoop forwarding request is sent as an outgoing snoop request to CPU1 524. Otherwise, the forwarding snoop request is 'downgraded' to a regular snoop request as the outgoing snoop request. CPU1 524 then responds to the outgoing snoop request. In the case of a forwarding snoop request, if CPU1 524 has the relevant data in its cache 526 then the data is forwarded directly to the requester (CPU0) 502 in a snoop response. In the case of a nonForwarding snoop request, if CPU1 524 has the relevant data in its cache 526 then the data is forwarded back to the home node 506 in a snoop response. If the data is not held in the cache 526 of CPU0 502 then a snoop response can be sent to the home node 506 indicating that the data is not present.

In this way, a snoop forwarding request is received by CPU1 524 (enabling DCT) if CPU1 524 has write access to the requested data. If CPU1 524 lacks write access then CPU1 receives a regular snoop request, causing the data (if it is present) to be sent to the home node 506. The home node can then filter the data if it has been modified, and prevent it from being propagated or leaked into the system.

The following table illustrates the downgrading process performed by the data processing apparatus 516:

| Snoop Opcode | Translated Snoop Opcode |
|---|---|
| SnpOnceFwd | SnpNotSharedDirty |
| SnpCleanFwd | SnpClean |
| SnpNotSharedDirtyFwd | SnpNotSharedDirty |
| SnpSharedFwd | SnpShared |
| SnpUniqueFwd | SnpUnique |

In all but once case, the downgrading simply translates a forwarding snoop request to its non-forwarding variant—thereby disabling DCT. In the case of the SnpOnceFwd snoop request, the request is translated to a SnpNotSharedDirty snoop request. The SnpOnceFwd snoop request causes a copy of the data to be provided, without causing a change in the state of the data at the cache. Such a snoop request can be used for the purposes of I/O—in particular, where a copy of the data is desired for non-caching purposes. Since the data is not being provided for caching purposes, there is no need for the state to change. In such cases, the I/O is unable to distinguish between clean or dirty data. The snoop request SnpNotSharedDirty therefore causes the requesting node to disclose the true dirty or clean response (in contrast to SnpOnceFwd). Of course, it will be appreciated that messages used in other coherency protocols may also be usable.

Figure 6:
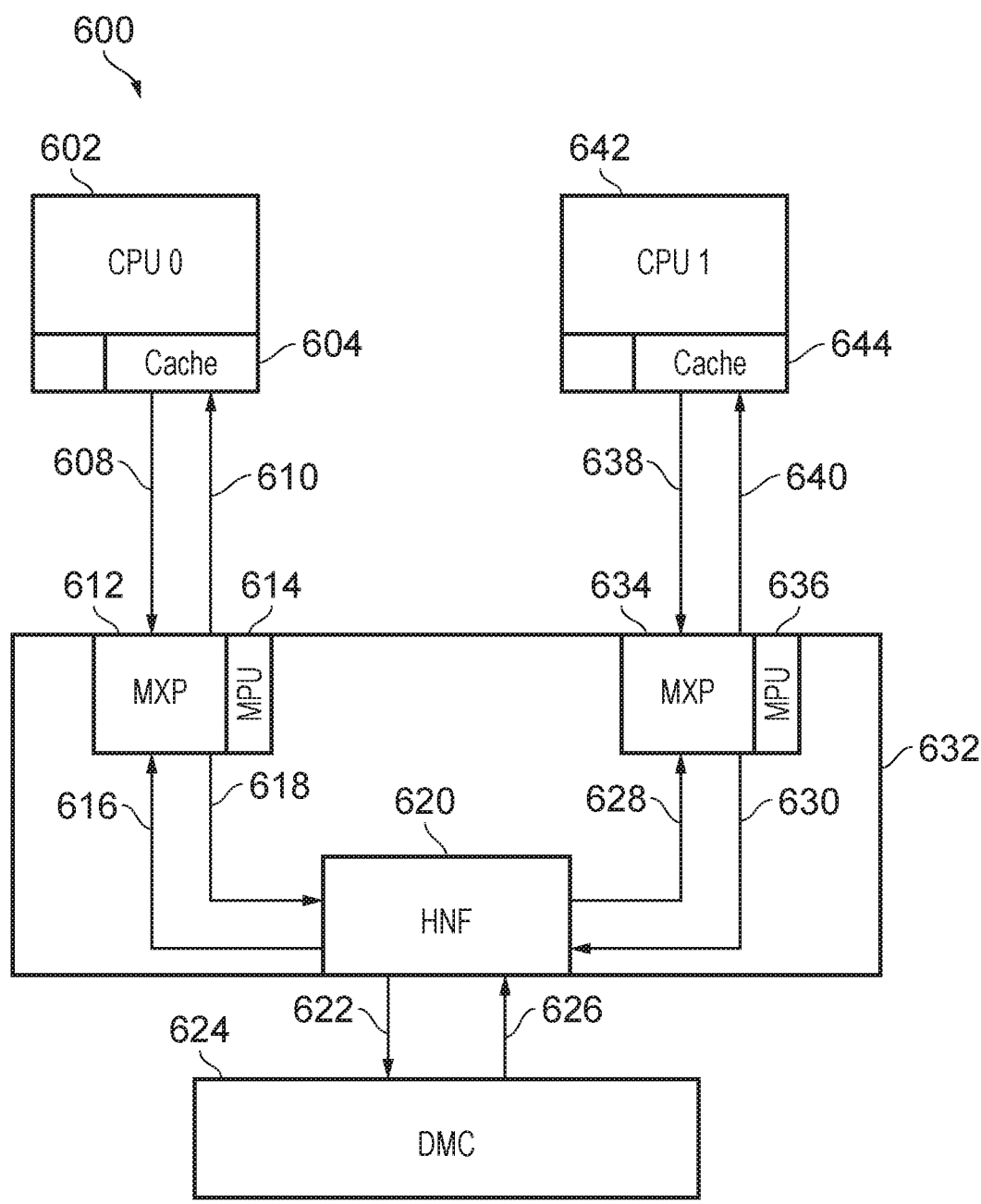
FIG. 6 illustrates, in more detail, the message propagation for the network illustrated in FIG. 5 when the snoop target lacks write access to the data.

FIG. 6 illustrates, in more detail, the message propagation for the network illustrated in FIG. 5 when the snoop target lacks write access to the data. CPU0 602 issues a request 608 for data. The request is intercepted by the MPU 614 of an MXP 612 associated with the requester 602. Here, permissions of the requester 602 towards the data are inserted into the request, and the request 618 is forwarded to the home node 620. At the home node 620, the permissions of CPU0 602 are checked. In particular, if CPU0 602 lacks write access then the home node 620 is constrained to issuing a non-forwarding snoop request. This is because otherwise, modified data that has not been written back to memory could be provided to CPU0 602 in response to CPU0's request. If this were to happen then, lacking write permission to the data, this modification could not then be redistributed—otherwise it would not be possible to determine whether the modification had been made by CPU0 602 as opposed to the node that provided the modified data to CPU0 602.

Regardless of the type of the snoop request (forwarding or non-forwarding), it is sent 628 to CPU1 642. During this process, it is intercepted by the cross point MXP 634 associated with the target CPU 642. Here, the permissions of the target CPU1 in relation to the data is considered using the MPU 636, and forwarding or demotion of the forwarding snoop request may take place. The resulting outgoing snoop request is transmitted 640 to CPU1 642.

In this example, it is determined by the MXP 634 that CPU1 642 lacks write access to the data. Therefore, a non-forwarding snoop request is transmitted 640 by the MXP 634. Here it is assumed that the data is present in the cache 644 of CPU1 642 and so a snoop response containing the data is provided 638 back to the home node 620 via the MXP 634, which forwards 630 the snoop response to the home node 620. Since the data has been obtained, the data is then transmitted 616 to the MXP 612 associated with the requester node 602. The MXP 612 then forwards 610 the obtained data to the requester 602.

A similar process occurs when the data is not found in the cache 644 of CPU1 642. In such a situation, regardless of the type (forwarding or non-forwarding) of the snoop request, a snoop response is transmitted 638 to the MXP 634, where it is forwarded 630 to the home node 620. The snoop response does not contain any data, because there was no data to return. Consequently, the home node 620 transmits 622 a request to the DMC 624 for the requested data, which retrieves the data from main memory. The DMC 624 returns 626 the requested data, which the home node 620 transmits 616 back to the MXP 612, where it is forwarded 610 back to the requester node 602.

Figure 7:
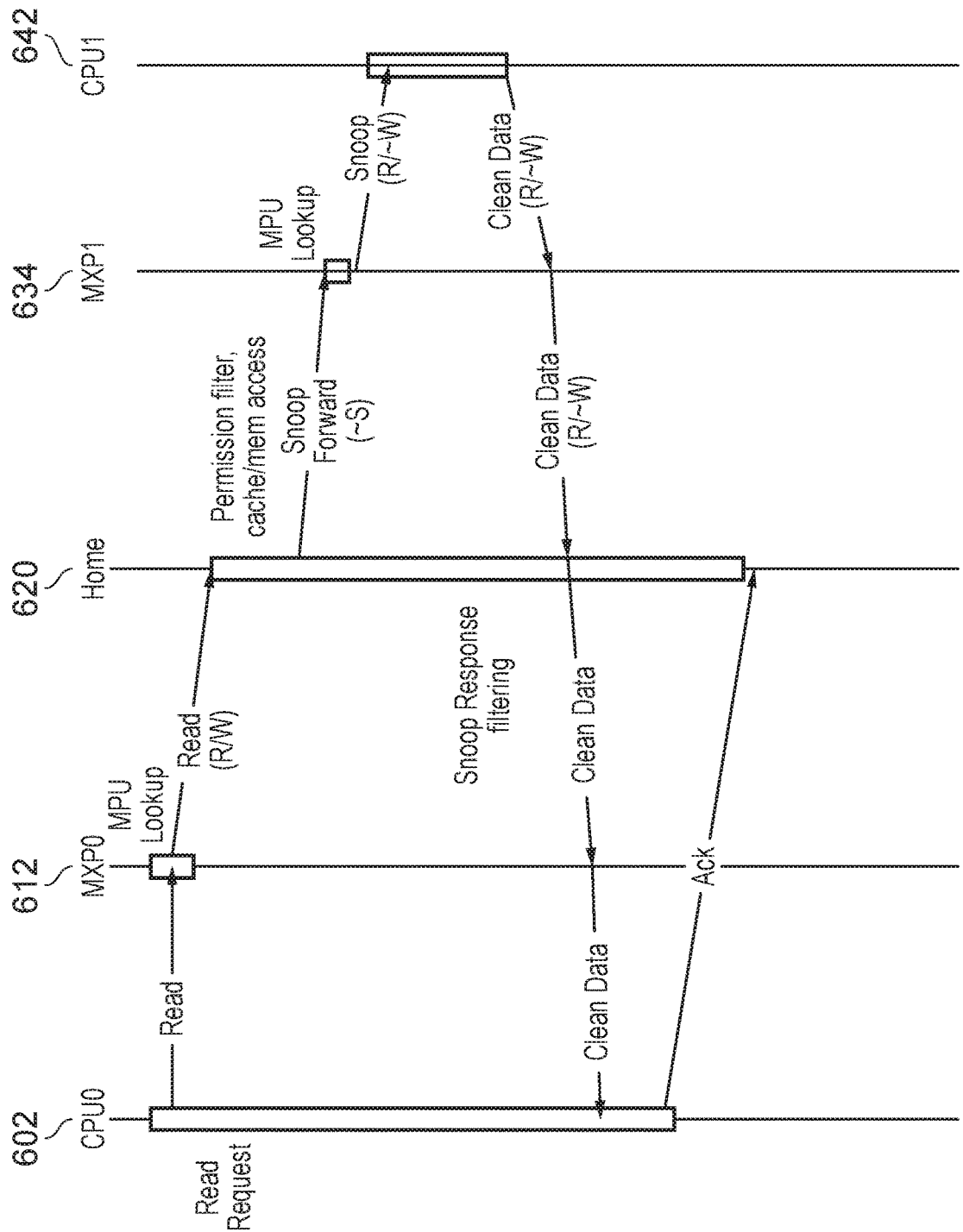
FIG. 7 illustrates a communication diagram that shows the behaviour of the nodes in response to the message exchange of FIG. 6.

FIG. 7 illustrates a communication diagram that shows the behaviour of the nodes in response to the message exchange of FIG. 6. As previously explained, a request is issued from CPU0 602 to MXP0 612. Here, an MPU lookup is performed to determine the permissions of CPU0 602 in respect of the data. The request, together with the access permissions, are forwarded to the home node 620, which performs permission filtering. In this example, CPU0 602 has both read (R) and write (W) access to the data, and so a forwarding snoop request is transmitted. In this example, the home node 620 (having responsibility for consistency in the system) also knows that the data in question is not stored in a shared state (~S). This information is encapsulated within the forwarding snoop request, which is sent to CPU1 642. The request is intercepted by MXP1 634, which performs a lookup on the requested data and determines that the target of the forwarding snoop request (CPU1 642) has read-only access to the data, i.e. read access but no write access. Since the target 642 has no write access (~W) and since the data is not shared (~S), the permissions (R/~W) are sent in a non-forwarding snoop request, which is sent to CPU1 642. That is to say that the forwarding snoop request is demoted to a non-forwarding snoop request. In response, CPU1 642 transmits the requested data back to the home node 620, via the MXP1 634 in the form of a snoop response. The snoop response also contains the permissions of CPU1 642 in respect of the data, which enables the home node to determine how to treat the data. The data may, at this stage, be written back to memory. The clean data is then forwarded back to CPU0 602 via MXP0 612, after which the data is acknowledged by CPU0 602 to the home node 620.

Note that in the request transmitted 640 from the MXP 634 to CPU1 642, the permissions of the target node CPU1 642 are included, even though a determination has been made as to whether the correct permissions are present for a forwarding snoop request to be issued. This is because if CPU1 642 must respond back to the home node 620 then the relevant permissions must be sent back to the home node 620 to determine how to handle the provided data.

Figure 8:
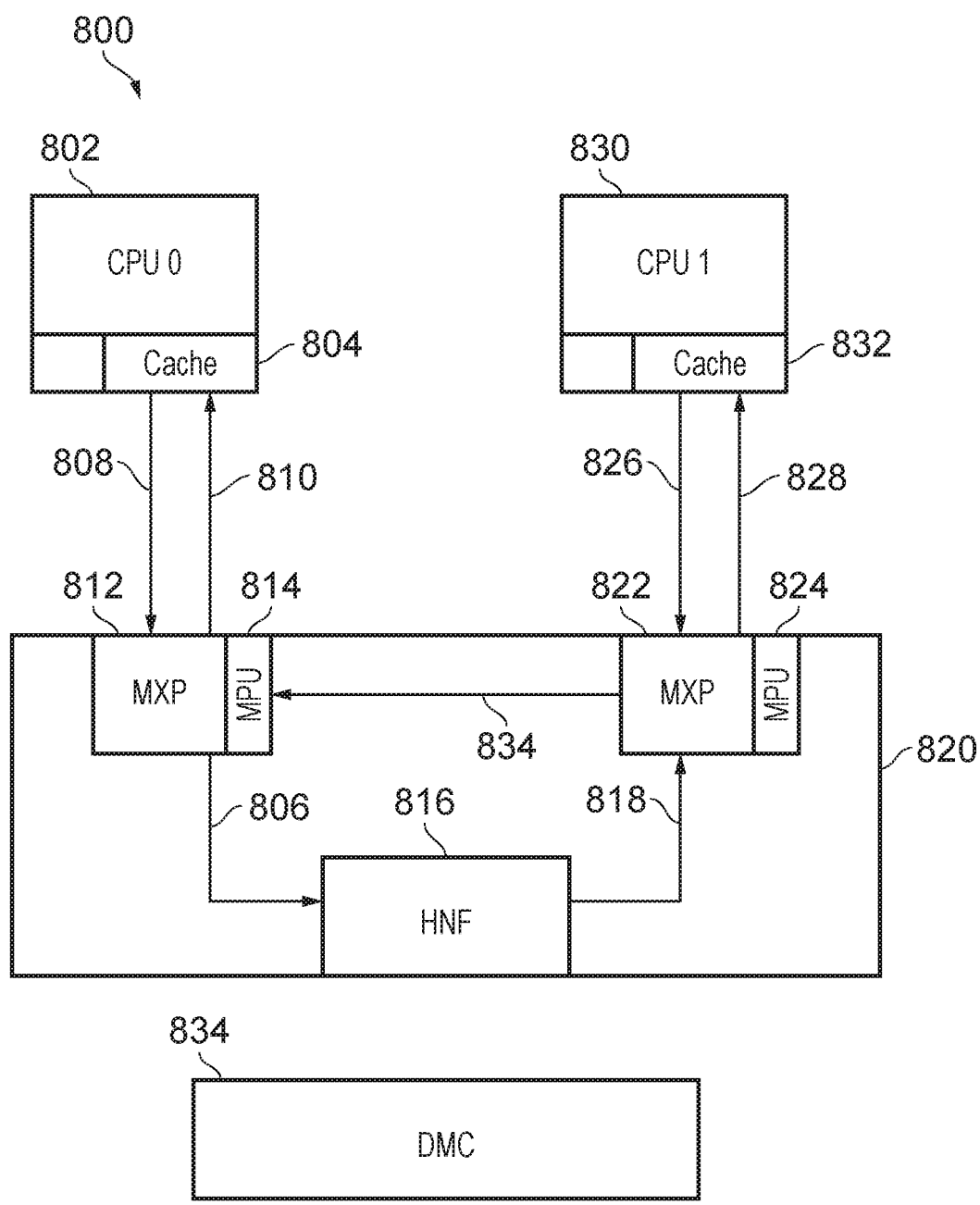
FIG. 8 illustrates, in more detail, the message propagation for the network illustrated in FIG. 5 when the snoop target has write access to the data.

FIG. 8 illustrates, in more detail, the message propagation for the network illustrated in FIG. 5 when the snoop target has write access to the data. CPU0 802 issues a request 808 for data not held in its cache 804. The request is intercepted by the MPU 814 of an MXP 812 associated with the requester 802. Here, permissions of the requester 802 in relation to the data are inserted into the request, and the request 806 is forwarded to the home node 816. At the home node 816, the permissions of CPU0 802 are checked. In particular, if CPU0 802 lacks write access then the home node 816 is constrained to issuing a non-forwarding snoop request as previously discussed.

Regardless of the type of the snoop request (forwarding or non-forwarding), the snoop request is sent 818 to CPU1 830. During this process, it is intercepted by the cross point MXP 822 associated with the target CPU 830. Here, the permissions of the target CPU1 830 in relation to the data is considered using the cross point's MPU 824, and forwarding or demotion of the forwarding snoop request may take place as previously discussed. The resulting outgoing snoop request is transmitted 828 to CPU1 830.

In this example, it is assumed that the data was found in the cache 832 of CPU1 830. Hence, a snoop response is transmitted 826 to the MXP 822, where it is forwarded 834 to the requester 802 via the requester's associated cross point MXP 812. That is, the request uses DCT and does not travel through the home node. In this case, since the provider of the data, CPU1 830 has write access to the data, it is permitted to redistribute any modifications made to that data, and so the data need not be forwarded back to the home node 816 for filtering.

Figure 9:
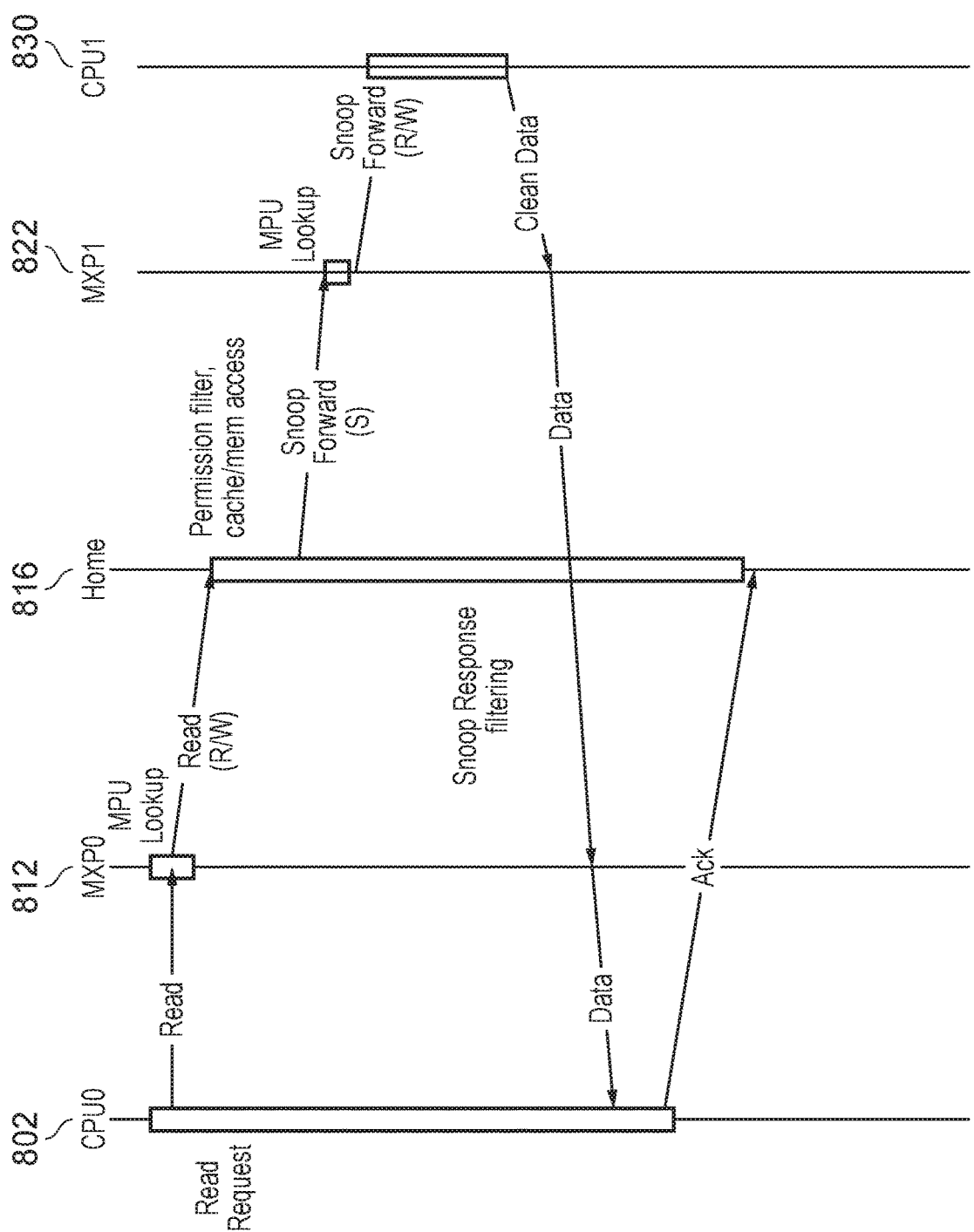
FIG. 9 illustrates a communication diagram that shows the behaviour of the nodes in response to the message exchange of FIG. 8.

FIG. 9 illustrates a communication diagram that shows the behaviour of the nodes in response to the message exchange of FIG. 8. As previously explained, a request is issued from CPU0 802 to MXP0 812. Here, an MPU lookup is performed to determine the permissions of CPU0 802 in respect of the data. The request, together with the access permissions, is forwarded to the home node 816, which performs permission filtering. In this example, CPU0 802 has both read (R) and write (W) access to the data, and so a forwarding snoop request is transmitted. In this example, the home node 816 (having responsibility for consistency in the system) also knows that the data in question is stored in a shared state (S). That is that the data is stored at other nodes in the system and so should be clean (i.e. not dirty) in order to provide consistency between the nodes. This information is encapsulated within the forwarding snoop request, which is sent to CPU1 830. The request is intercepted by MXP1 822, which performs an MPU lookup and determines that the target of the forwarding snoop request (CPU1 830) has read and write access to the requested data.

A forwarding snoop request can therefore be issued by MXP1 822 to CPU1 830 for two reasons. Firstly, CPU1 830 has write access to the data. Hence, any modifications made to the data are permitted and so can be distributed to other nodes in the network. Secondly, the shared state hint (S) means that the data is being stored by other nodes in the network and so should not have been modified. It may therefore be assumed that this data has not been modified, and so again, the data can be transmitted from CPU1 830 directly to the requester 802 via the requester's MXP 812. An acknowledgement is then sent by the requester 802 to the home node 816.

Figure 10:
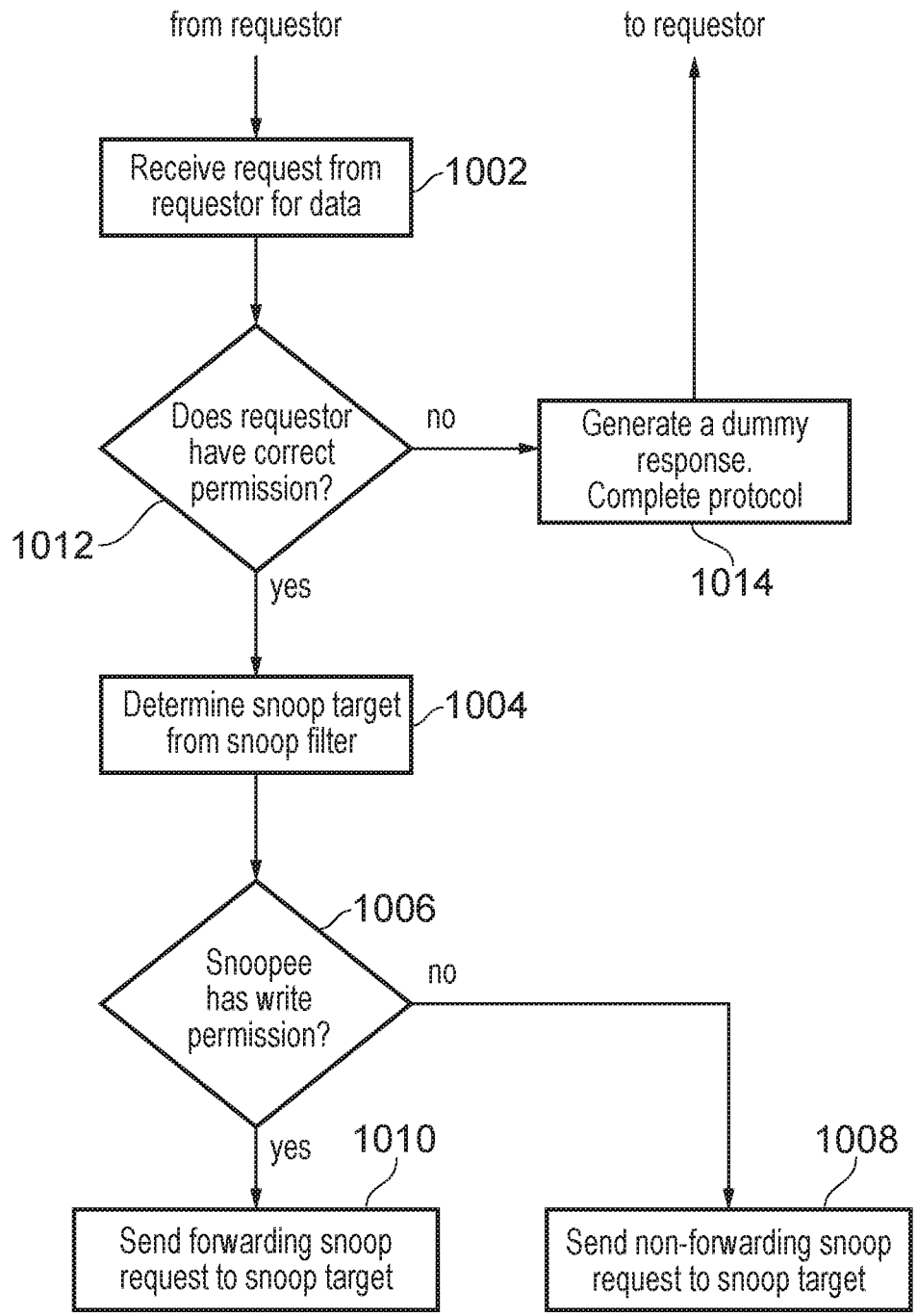
FIG. 10 shows a flow chart that illustrates a process performed by the home node in accordance with some embodiments.

FIG. 10 shows a flow chart 1000 that illustrates a process performed by the home node 816. At a step 1002, the request for data is received from the requester. At a step 1012, it is determined whether the requester has the correct permissions. In particular, the requester should have read permissions to the requested data. If the CPU does not have read permission, it must not access data and hence a dummy response is returned to complete the protocol flow. Step 1012 will also check if the requestor had write permission for the requested data. If the requestor only has read permission (and not write permission), then only clean data can be provided by the home node. The reason for this is that if a dirty copy of the data was subsequently forwarded to the requester, then any writebacks from the requestor would be dropped by home node (due to a lack of write permission), thereby causing validly written data from the snoop target to be lost. Otherwise, at a step 1004, the snoop target 830 is determined using the home node's snoop filter. At a step 1006, if the requester has write permission for the data then at step 1010, a forwarding snoop request is issued by the home node 816 to the snoop target 830. The use of a forwarding snoop permits dirty data to be transmitted to the requester, since the requested data need not be received via the home node. If the requester does not have write access, then at step 1008, a non-forwarding snoop request is sent to the snoop target 830. This causes the data to be returned to the home node where it can be written back (e.g. made clean). The clean data can then be returned to the requesting node. The forwarding snoop request is able to store permissions of the snoop target 830 in relation to the data. The permissions need not be supplied by the home node 816 but can instead be provided on route to the snoop target 830.

Figure 11:
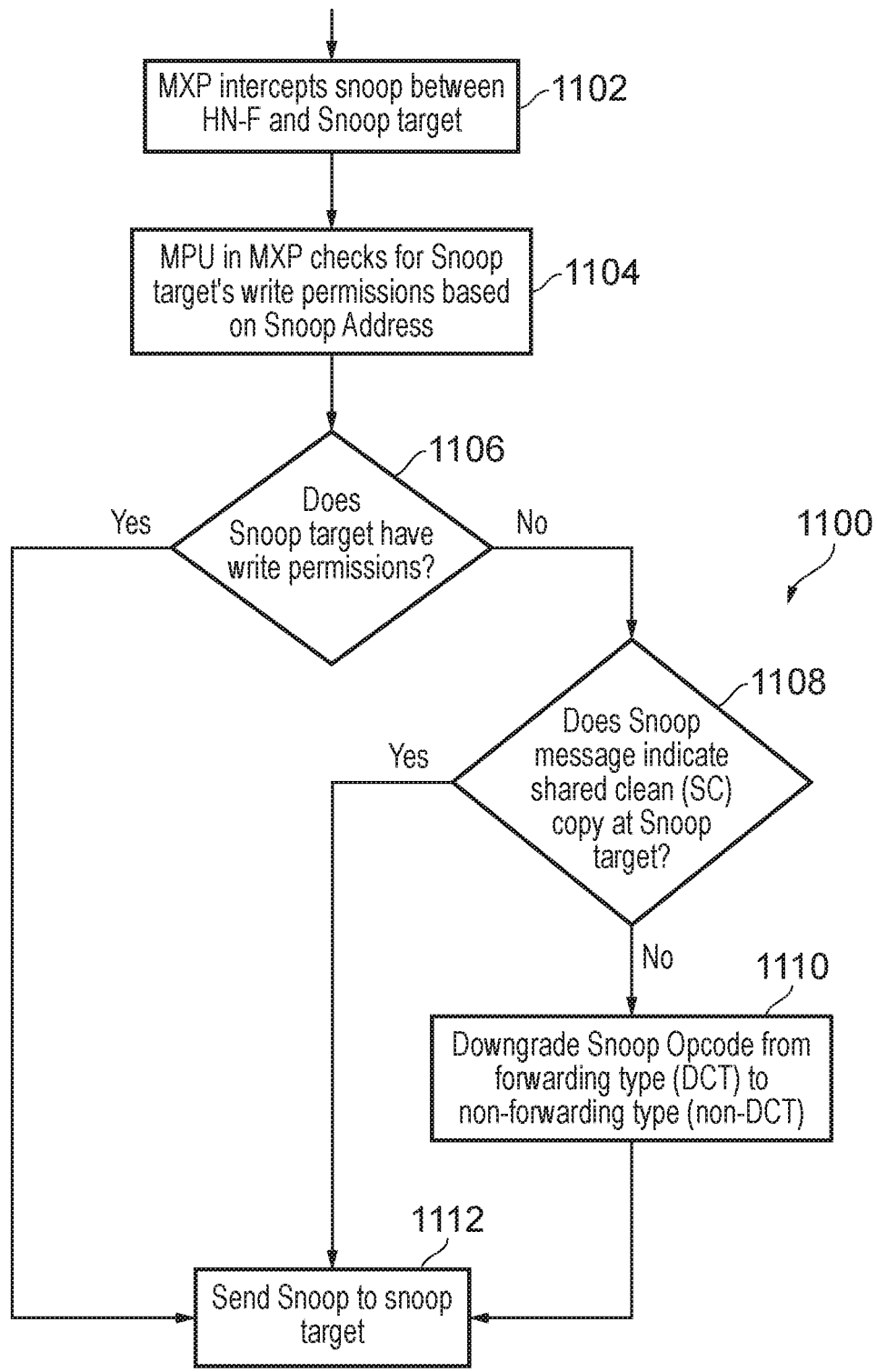
FIG. 11 shows a flow chart that illustrates a process performed by the cross point in accordance with some embodiments.

FIG. 11 shows a flow chart 1100 that illustrates a process performed by MXP1 822. At a step 1102, the MXP intercepts a snoop request that has been send to the snoop target 830. At step 1104, the MPU checks the permissions of the snoop target in respect of the data (i.e. for the requested address where the data is located). If the target 830 has write permission then at step 1112, the incoming forwarding snoop request is forwarded to the snoop target 830. If the target lacks write permission then at step 1108, it is determined if the forwarding snoop request indicates that the data is held in a shared clean state (SC). If so, then again, at step 1112, the forwarding snoop request is sent on to the target 830. If not, the forwarding snoop request is downgraded to a non-forwarding snoop request at step 1110 and at step 1112, the (now non-forwarding) snoop request is send to the target 830.

Figure 12:
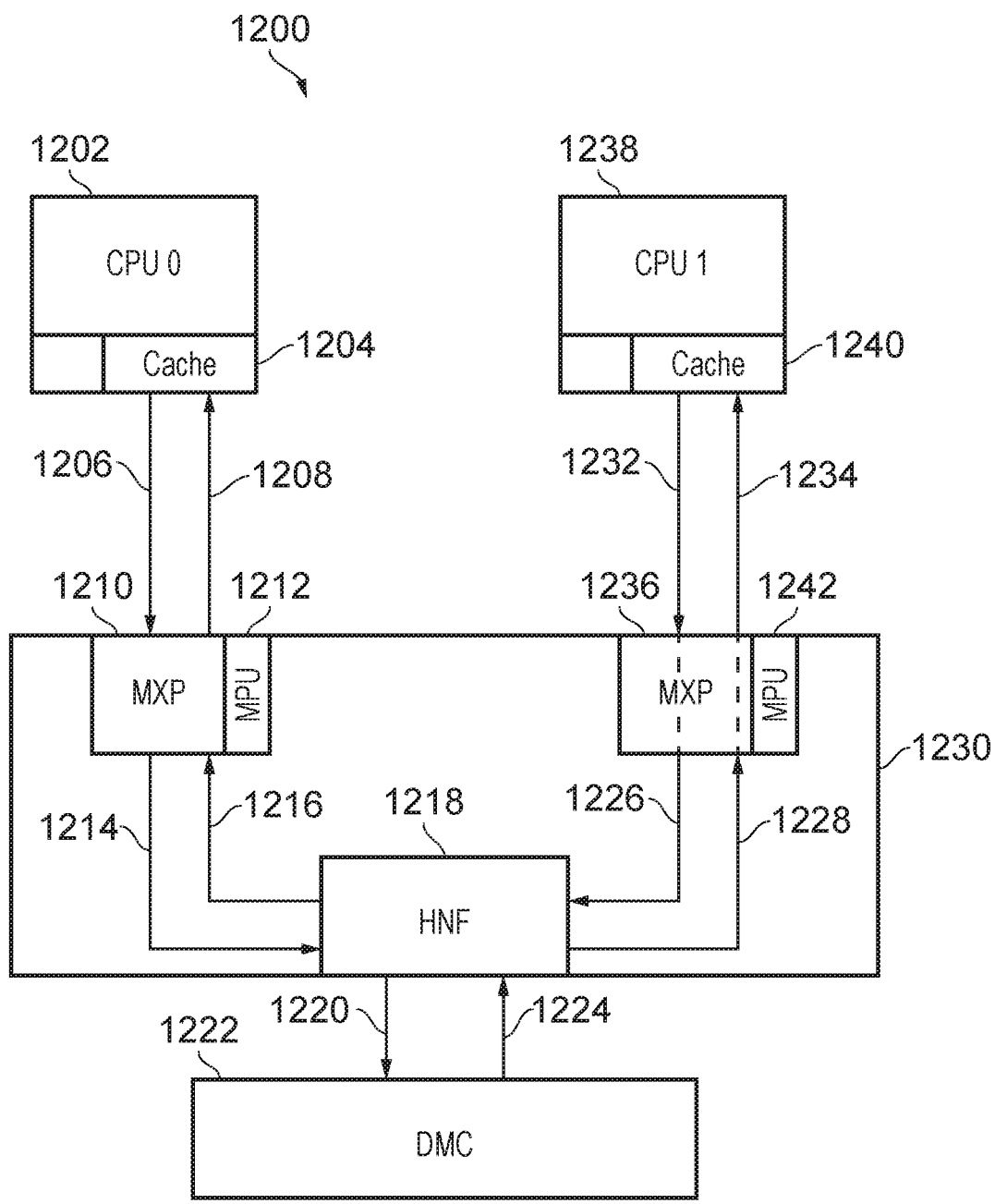
FIG. 12 illustrates, in more detail, the message propagation for the network illustrated in FIG. 4 when the snoop target lacks write access to the data.

FIG. 12 illustrates, in more detail, the message propagation for the network illustrated in FIG. 4 when the snoop target lacks write access to the data. CPU0 1202 issues a request 1206 for data not held within its cache 1204. The request is intercepted by the MPU 1212 of an MXP 1210 associated with the requester 1202. Here, permissions of the requester 1202 towards the data are inserted into the request, and the request 1214 is forwarded to the home node 1218. At the home node 1218, the permissions of CPU0 1202 are checked. In particular, if CPU0 1202 lacks write access then the home node 1218 is constrained to issuing a non-forwarding snoop request as previously described.

Note that in other embodiments, the snoop request is capable of storing the permissions of the snoop target, but the permissions themselves are inserted as the snoop request is forwarded through the network (e.g. by the MPU 1242 of the MXP 1236 associated with the snoop target 1238).

Regardless of the type of the snoop request (forwarding or non-forwarding), it is sent 1228 to CPU1 1238. During this process, the permissions of the snoop target 1238 are added to the request by the MXP 1236 and its associated MPU 1242 before being retransmitted 1234.

In this example, it is assumed that CPU1 1238 lacks write access to the data and also that the data is dirty (i.e. it has been modified since being written back to the memory). Consequently, the snoop response containing the data is transmitted 1232 back to the MXP 1236. This is then transmitted 1226 back to the home node 1218. Since the data has been obtained, there is no interaction with the DMC 1222 and the data is transmitted back to the MXP 1210 and on 1208 to CPU0 1202. Note that a similar behaviour would occur if the snoop request were a non-forwarding snoop request, even if the node 1238 were to have write access (W) to the data.

If the data was not found in the cache 1240 of CPU1 1238, a snoop response is transmitted 1232 to the MXP 1236, where it is forwarded 1226 to the home node 620. The snoop response does not contain any data, because there was no data to return. As previously described, the home node 1218 then acquires the data by sending 1220 a request to the DMC 1222, which returns 1224 the data. The data is then forwarded 1216 back to the MXP 1210 and from there, forwarded 1208 to the requester 1202.

In some embodiments, even if CPU1 1236 lacks write access to the data, then if the data is clean, it may still be forwarded back to the requester CPU0 1202 using DCT. This is because there is considered to be little harm in transmitting unmodified data in this manner.

Figure 13:
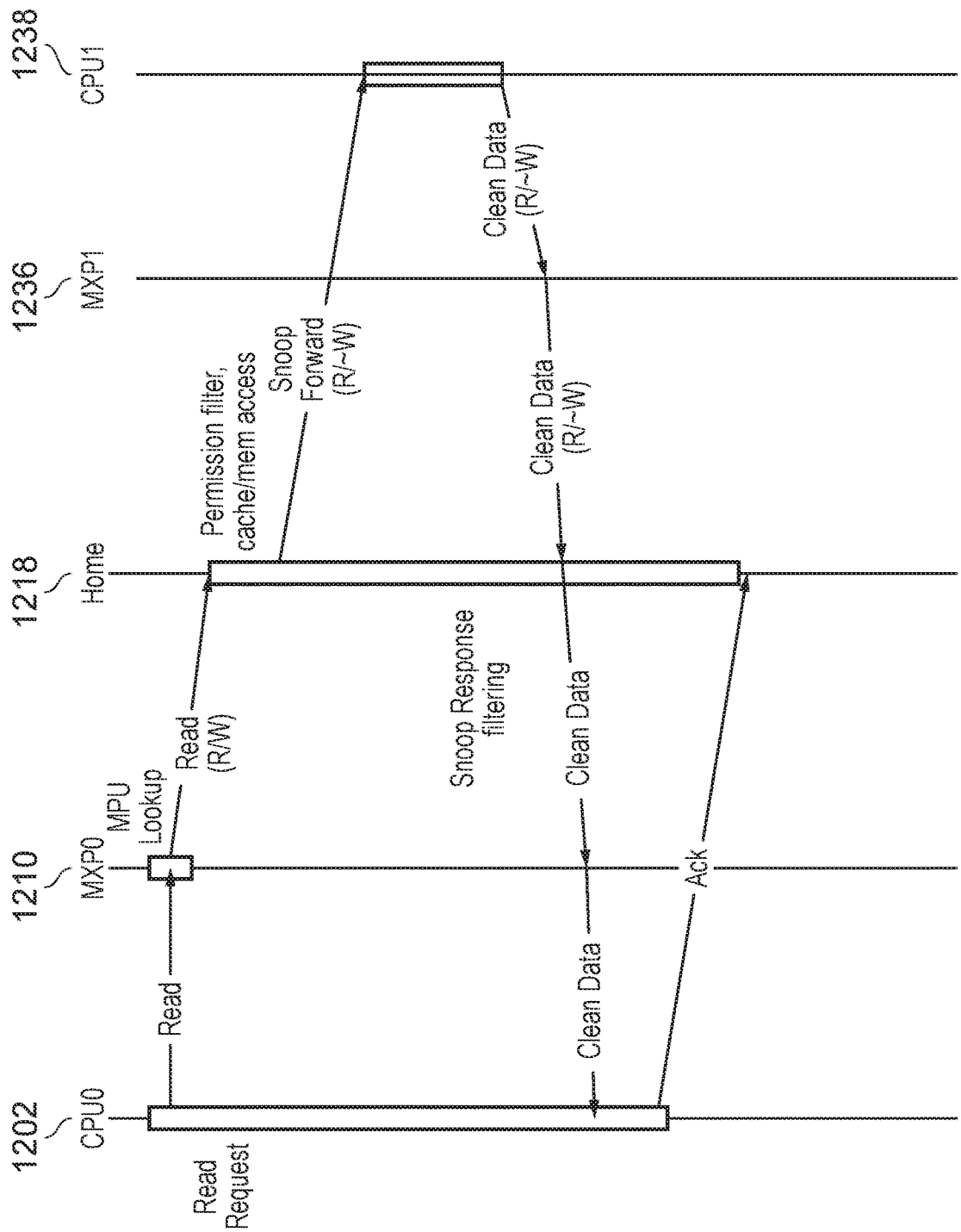
FIG. 13 illustrates a communication diagram that shows the behaviour of the nodes in response to the message exchange of FIG. 12.

FIG. 13 illustrates a communication diagram that shows the behaviour of the nodes in response to the message exchange of FIG. 12. As previously explained, a request is issued from CPU0 1202 to MXP0 1210. Here, an MPU lookup is performed to determine the permissions of CPU0 1202 in respect of the data. The request, together with the access permissions, is forwarded to the home node 1218, which performs permission filtering. In this example, CPU0 1202 has both read (R) and write (W) access to the data, and so a forwarding snoop request is transmitted to CPU1 1238. As previously discussed, if the requester 1202 only had read access to the data, then a non-forwarding snoop request may be issued instead.

The snoop request has the permissions of CPU1 1238 added. This can be performed at the home node using permission obtaining circuitry, or it can be added on route as the snoop request is forwarded to the snoop target 1432, e.g. by MXP1 1236. In this example, it is determined that the target of the forwarding snoop request (CPU1 1238) has read-only access to the data, i.e. read access but no write access. The snoop target 1238 receives the forwarding snoop request and, from the enclosed permissions, determines that it does not have write access to the data. The snoop target 1238 also determines that the data is not clean. Consequently, it transmits a response containing the data back to the home node 1218, via the MXP 1236. From there, a decision can be taken as to how to treat the received data—depending on the permissions. In this example, the data is transmitted back to the requester 1202 via the requester's MXP 1210. The requester 1202 then issues an acknowledgement to the home node 1218.

Figure 14:
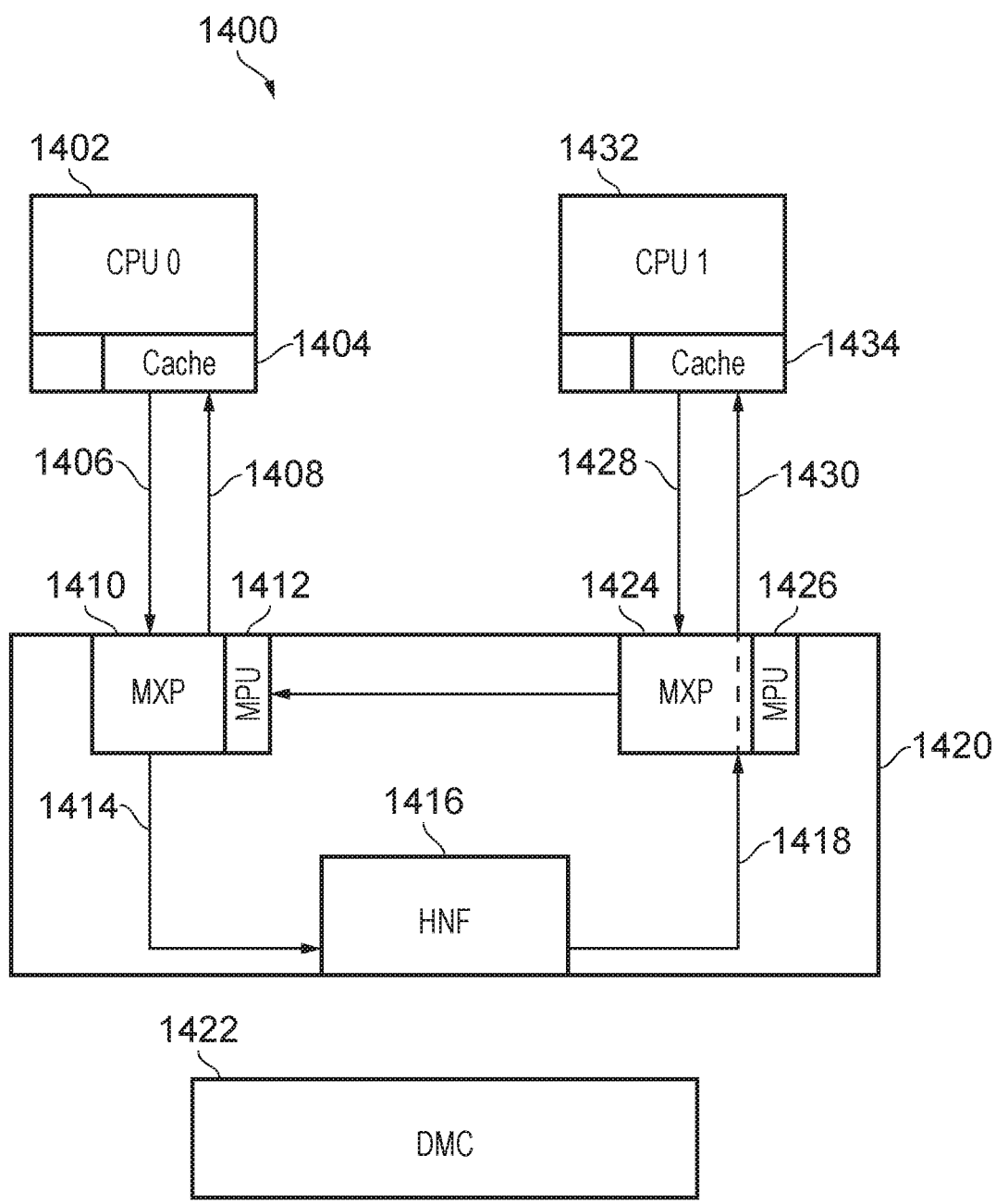
FIG. 14 illustrates, in more detail, the message propagation for the network illustrated in FIG. 4 when the snoop target has write access to the data.

FIG. 14 illustrates, in more detail, the message propagation for the network illustrated in FIG. 4 when the snoop target 1432 has write access to the data. CPU0 1402 issues a request 1406 for data. The request is intercepted by the MPU 1412 of an MXP 1410 associated with the requester 1402. Here, permissions of the requester 1402 towards the data are inserted into the request, and the request is forwarded 1414 to the home node 1416. At the home node 1416, the permissions of CPU0 1402 are checked. In particular, if CPU0 1402 lacks write access then the home node 1416 is constrained to issuing a non-forwarding snoop request as previously discussed.

Regardless of the type of the snoop request (forwarding or non-forwarding), it is sent 1418 to CPU1 1432. During this process, as previously described, the permissions of the target CPU1 1432 are added as part of the outgoing request 1430 sent by the MXP 1424 to the target CPU1 1432. This could be by the home node 1416, or could be on route via, e.g. MXP1 1424.

In this example, it is assumed that the data is in the cache 1434 of CPU1 1432. In addition, the target CPU 1432 determines, from the permissions included in the incoming snoop request, that it has write access to the requested data. Consequently, a snoop response containing the data is transmitted 1428 to the requester 1402 via the target's MXP 1424 and the requester's MXP 1410. That is, the request uses DCT and does not travel through the home node 1416. In this case, since the provider of the data, CPU1 1432 has write access to the data, it is permitted to redistribute any modifications made to that data, and so the data need not be forwarded back to the home node 1416 for filtering.

A similar process may be performed if the data in question is clean, even if the target node 1238 does not have write access, since it may be determined that using DCT for unmodified (clean) data poses little or no risk of modifications being leaked to other nodes.

Figure 15:
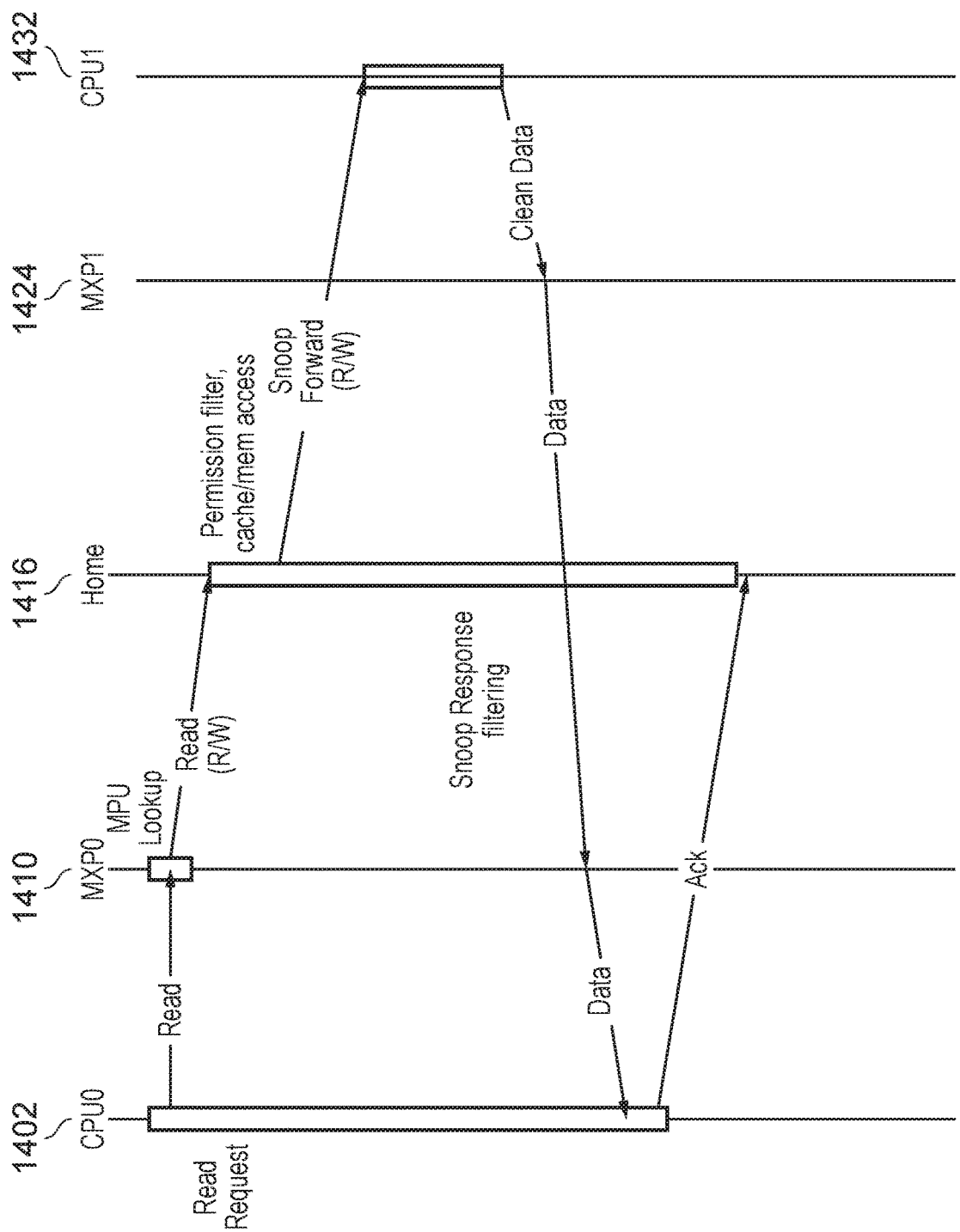
FIG. 15 illustrates a communication diagram that shows the behaviour of the nodes in response to the message exchange of FIG. 14.

FIG. 15 illustrates a communication diagram that shows the behaviour of the nodes in response to the message exchange of FIG. 14. As previously explained, a request is issued from CPU0 1402 to MXP0 1410. Here, an MPU lookup is performed to determine the permissions of CPU0 1402 in respect of the data. The request, together with the access permissions, is forwarded to the home node 1416, which performs permission filtering. In this example, CPU0 1402 has both read (R) and write (W) access to the data, and so a forwarding snoop request is transmitted. The permissions of the snoop target 1432 are added either on route to the target 1432 or by the home node itself 1416 if the home node has access to an MPU or other circuitry to determine the permissions of the target 1432 in respect of the data.

At CPU1, 1432, the node determines that it both has the data and (from the permissions in the request) that it has write access to the data. Consequently, CPU1 1432 issues a snoop response containing the data back to the requester directly. This request passes through the cross point MXPs 1424, 1410, but not the home node 1416. This is because since CPU1 1432 has write access to the data, any modifications made to that data are permitted and so can be distributed to other nodes in the network.

Once the data is received by the requester 1402, an acknowledgement is sent by the requester 1402 to the home node 1416.

Again, as previously described, a similar process may occur in response to the snoop target node 1238 determining that the data is clean, even if that node 1238 has no write access.

Figure 16:
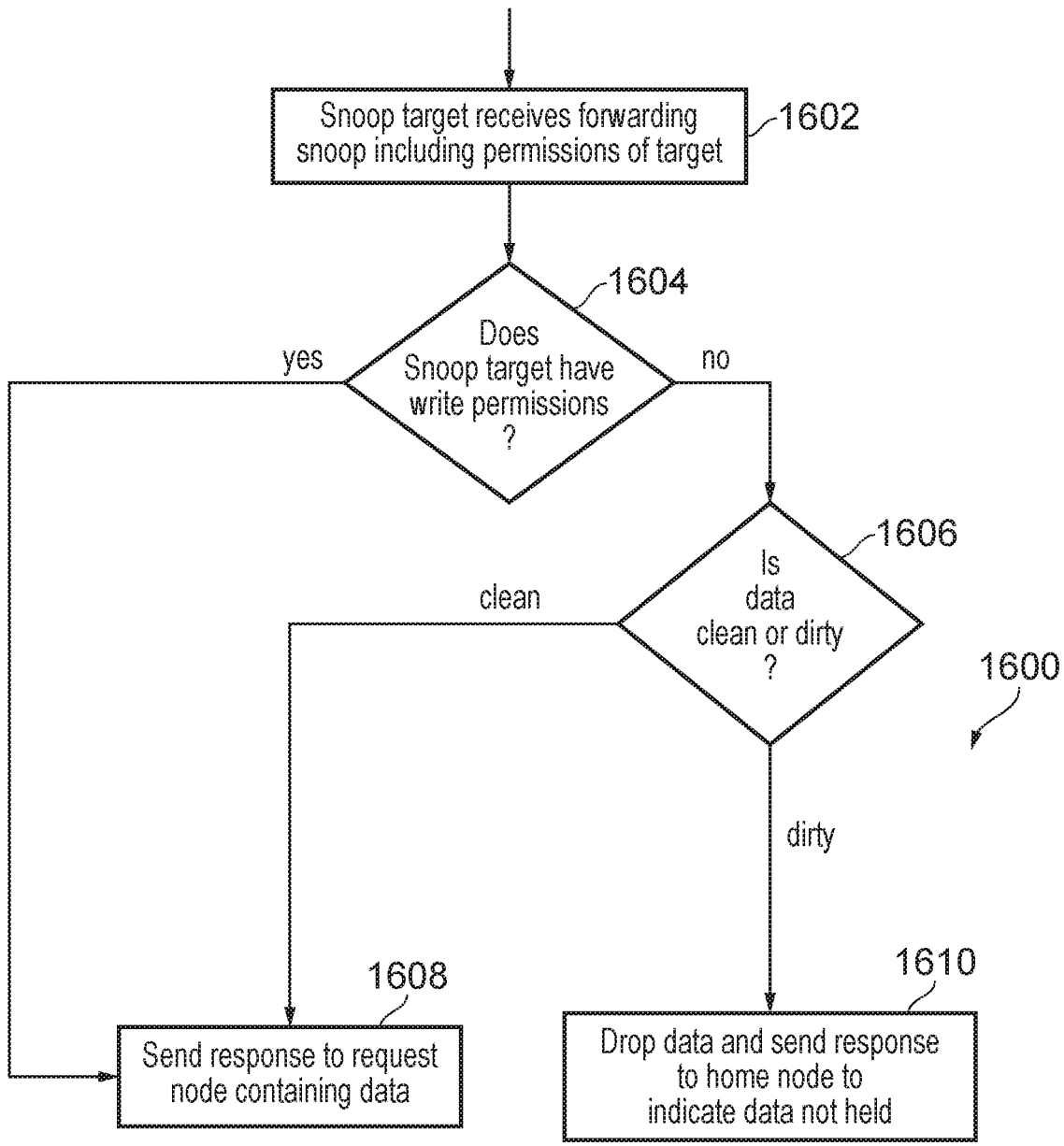
FIG. 16 shows a flowchart that illustrates a process performed by the target node.

FIG. 16 shows a flowchart 1600 that illustrates a process performed by the target node 1432. At a step 1602, the snoop target receives a forwarding snoop request, which include the permissions of the target node 1432 itself in relation to the data. At step 1604, the target node determines, from these permissions, whether it has write access to the data being requested. If so, then at step 1608, a snoop response is sent to the request node containing the data. If not, then at step 1606, it is determined whether the data is clean or dirty (i.e. whether the data has been modified and not yet written back to main memory). If the data is clean, then even though the node does not have write access to the data, it issues, at step 1608, a snoop response to the requester containing the data. This is because, if it can be determined that the data has not been modified, then there should be no harm in forwarding this data directly to the requester, i.e. there should be no leak of disallowed modifications. Otherwise, the process proceeds to step 1610 where the modified data is discarded, and an empty snoop response is sent back to the home node to state that the data is not present. This represents the situation in which the node had no access right to modify the data, and yet the data has been modified anyway. In this situation, the modified data must be discarded—at which point, the node should notify the home node that the data is not present. This may necessitate the home node acquiring the data from main memory if it cannot be obtained from, e.g. another node.

Accordingly, the above techniques illustrate a number of ways in which a system can be made to use DCT even in the presence of memory protection, where different nodes may have differing levels of access to data. In particular, where different nodes variously have read/write or read-only access, the system's use of DCT inhibits illegally modified data from being propagated or leaked into the system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus, further comprising:
   receive circuitry to receive a request to access data at an access address from a requester;
      processing circuitry to generate a forwarding snoop request, wherein the forwarding snoop request causes a target to forward the data to the requester; and
   transmit circuitry to send the forwarding snoop request to the target;
   permission obtaining circuitry to obtain, for one or more address ranges, an access permission of the target, wherein
   the forwarding snoop request is capable of indicating one or more access permissions of the target in relation to the data;
   the permission obtaining circuitry is adapted, in response to receiving the request to access data, to obtain a permission corresponding to one of the one or more address ranges that encompasses the access address range as the one or more access permissions, and
   wherein the processing circuitry is further adapted to generate the forwarding snoop request comprising the one or more access permissions.

2. The data processing apparatus according to claim 1, further comprising:
   snoop filter circuitry to determine, using the access address, the target as a device having current ownership of the data.

3. The data processing apparatus according to claim 1, wherein the transmit circuitry is further adapted to send the forwarding snoop request to the target via a Memory Protection Unit.

4. The data processing apparatus according to claim 1, wherein:
   the receive circuitry is further adapted to receive a snoop response from the target; and
   the processing circuitry is further adapted:
      if the snoop response contains the data, to cause the transmit circuitry to forward the data to the requester, and
      otherwise, to cause the transmit circuitry to transmit a request for the data from a main memory and in response to receiving the data from the main memory, to forward the data to the requester.

5. The data processing apparatus according to claim 1, wherein the forwarding snoop request comprises a field to indicate the one or more access permissions.

6. The data processing apparatus according to claim 1, wherein the forwarding snoop request is capable of indicating a shared state of the data.

7. The data processing apparatus according to claim 1, wherein the one or more access permissions include whether the target has write access the data.

8. The data processing apparatus according to claim 1, wherein:
   the request comprises an indication of one or more access permissions of the requester in relation to the data; and
   the processing circuitry is further adapted:
      if the one or more access permissions of the requester indicate that the requester has both read and write access to the data, to cause the transmit circuitry to transmit the forwarding snoop request to the target, and
      otherwise if the one or more access permissions of the requester indicate that the requester has read access and lacks write access, to cause the transmit circuitry to transmit a non-forwarding snoop request to the target,
   wherein the non-forwarding snoop request causes the target to forward the data to the data processing apparatus.

9. A method comprising:
   receiving a request to access data at an access address from a requester;
   generating a forwarding snoop request, wherein the forwarding snoop request causes a target to forward the data to the requester;
   sending the forwarding snoop request to the target,
   obtaining, for one or more address ranges, an access permission of the target, wherein
   the forwarding snoop request is capable of indicating one or more access permissions of the target in relation to the data;
   in response to receiving the request to access data, a permission corresponding to one of the one or more address ranges that encompasses the access address range is obtained as the one or more access permissions; and
   the forwarding snoop request is generated to contain the one or more access permissions.

10. A data processing apparatus comprising:
   receive circuitry to receive a forwarding snoop request from a home node to provide data at an access address to a requester;
   permission obtaining circuitry to obtain, for one or more address ranges, an access permission of a target of the forwarding snoop request; and
   transmit circuitry to transmit an outgoing snoop request to the target of the forwarding snoop request,
   wherein the permission obtaining circuitry is adapted, in response to receiving the request to access data, to obtain a permission corresponding to one of the one or more address ranges that encompasses the access address range as the one or more access permissions, and
   wherein a type of the outgoing snoop request is based on the corresponding permission.

11. The data processing apparatus according to claim 10, wherein the type of the outgoing snoop request is any one of non-forwarding or forwarding.

12. The data processing apparatus according to claim 11, wherein in response to a determination that the one or more access permissions comprise a write permission of the target in relation to the data, the type of the outgoing snoop request is selected as a forwarding snoop request.

13. The data processing apparatus according to claim 11, wherein in response to a determination that the one or more access permissions lack a write permission of the target in relation to the data, the type of the outgoing snoop request is selected as a non-forwarding snoop request.

14. The data processing apparatus according to claim 11, wherein:
the forwarding snoop request comprises an indication of whether the target has shared access to the data; and
in response to a determination that the target has shared access to the data, the type of the outgoing snoop request is selected as a forwarding snoop request.

15. The data processing apparatus according to claim 11, wherein the outgoing snoop request comprises the one or more access permissions.

16. A method comprising:
receiving a forwarding snoop request from a home node to provide data at an access address to a requester;
storing, for one or more address ranges, an access permission of a target of the forwarding snoop request;
transmitting an outgoing snoop request to the target of the forwarding snoop request;
determining, in response to receiving the request to access data, one of the one or more address ranges that encompasses the access address range; and
acquiring a corresponding permission as the one or more access permissions,
wherein a type of the outgoing snoop request is based on the corresponding permission.

17. A data processing apparatus comprising:
receive circuitry to receive a forwarding snoop request from a home node to provide data at an access address to a requester, wherein the forwarding snoop request is capable of indicating one or more access permissions of the data processing apparatus in relation to the data;
cache circuitry to store the data together with associated modification indicator; and
transmit circuitry to transmit a snoop response based on the one or more access permissions and the modification indicator.

18. The data processing apparatus according to claim 17, wherein:
the transmit circuitry is further adapted, in response to the one or more access permissions comprising a write permission of a target in relation to the data, to transmit the snoop response to the requester; and
the snoop response comprises the data.

19. The data processing apparatus according to claim 17, wherein:
the transmit circuitry is further adapted, in response to the one or more access permissions lacking a write permission of a target in relation to the data, and the modification indicator indicating that the data is unmodified, to transmit the snoop response to the requester; and
the snoop response comprises the data.

20. The data processing apparatus according to claim 17, wherein:
the transmit circuitry is further adapted, in response to the one or more access permissions lacking a write permission of a target in relation to the data, and the modification indicator indicating that the data is modified, to transmit the snoop response to the home node and to delete the data from the cache circuitry; and
the snoop response indicates that the data processing apparatus lacks the data.

21. A method comprising:
receiving a forwarding snoop request from a home node to provide data at an access address to a requester, wherein the forwarding snoop request is capable of indicating one or more access permissions of a data processing apparatus in relation to the data;
storing the data together with associated modification indicator; and
transmitting a snoop response based on the one or more access permissions and the modification indicator.

* * * * *